United States Patent
Layne et al.

(10) Patent No.: US 9,604,258 B2
(45) Date of Patent: Mar. 28, 2017

(54) SORTATION SYSTEMS AND RELATED METHODS

(71) Applicant: SPAN TECH LLC, Glasgow, KY (US)

(72) Inventors: James L. Layne, Bowling Green, KY (US); Brian Keith Thomas, Cave City, KY (US); Steve C. Fye, Glasgow, KY (US); Lewis W. Ward, Glasgow, KY (US); Ervin Puskar, Bowling Green, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 14/376,480

(22) PCT Filed: Feb. 2, 2013

(86) PCT No.: PCT/US2013/024531
§ 371 (c)(1),
(2) Date: Aug. 4, 2014

(87) PCT Pub. No.: WO2013/116801
PCT Pub. Date: Aug. 8, 2013

(65) Prior Publication Data
US 2015/0001137 A1 Jan. 1, 2015

Related U.S. Application Data

(60) Provisional application No. 61/594,821, filed on Feb. 3, 2012, provisional application No. 61/680,444, filed on Aug. 7, 2012.

(51) Int. Cl.
*B07C 5/36* (2006.01)
*B65G 21/14* (2006.01)
(Continued)

(52) U.S. Cl.
CPC ........... *B07C 5/36* (2013.01); *B65G 21/14* (2013.01); *B65G 37/00* (2013.01); *B65G 47/46* (2013.01);
(Continued)

(58) Field of Classification Search
CPC .......... B07C 5/36; B65G 37/00; B65G 47/46; B65G 47/64; B65G 21/14; B65G 47/647; B65G 47/96
See application file for complete search history.

(56) References Cited

U.S. PATENT DOCUMENTS

| 2,830,693 A | 4/1958 | Schlossmacher |
| 3,605,982 A | 9/1971 | Adler |

(Continued)

FOREIGN PATENT DOCUMENTS

| DE | 102010005267 A1 | 7/2011 |
| EP | 1205266 A1 | 5/2002 |

(Continued)

*Primary Examiner* — Jeremy R Severson
(74) *Attorney, Agent, or Firm* — King & Schickli, PLLC

(57) ABSTRACT

A conveying system for intended use in sorting articles and related methods of conveying and sorting articles are disclosed. In one embodiment, the system comprises a first conveyor extending in a first direction and a second conveyor extending in a second direction, with the directions intersecting. A transfer conveyor, such as a transpositor conveyor, may be provided for transferring articles from one of the first conveyors to one of the second conveyors. The system may be used to sort articles delivered from one or more storage locations for distribution, or may instead be used to sort articles for delivery to one or more storage locations. Related aspects and methods are also described.

23 Claims, 44 Drawing Sheets

(51) Int. Cl.
  *B65G 47/46*   (2006.01)
  *B65G 37/00*   (2006.01)
  *B65G 47/53*   (2006.01)
  *B65G 47/64*   (2006.01)
  *B65G 47/96*   (2006.01)

(52) U.S. Cl.
  CPC .............. *B65G 47/53* (2013.01); *B65G 47/64* (2013.01); *B65G 47/647* (2013.01); *B65G 47/96* (2013.01); *B65G 47/962* (2013.01); *B65G 2207/18* (2013.01)

(56) References Cited

U.S. PATENT DOCUMENTS

| | | | |
|---|---|---|---|
| 3,690,435 A * | 9/1972 | King | B65G 47/647 |
| | | | 198/463.3 |
| 3,917,050 A | 11/1975 | Gregor | |
| 4,166,525 A | 9/1979 | Bruno | |
| 4,569,434 A | 2/1986 | Horii et al. | |
| 4,593,806 A * | 6/1986 | Tappe et al. | 198/369.7 |
| 4,815,582 A | 3/1989 | Canziani | |
| 4,832,204 A | 5/1989 | Handy et al. | |
| 5,154,260 A | 10/1992 | Patel | |
| 5,429,223 A * | 7/1995 | Moeller | B65G 47/647 |
| | | | 198/369.1 |
| 5,715,930 A | 2/1998 | Hogenkamp | |
| 5,755,308 A | 5/1998 | Lindstrom et al. | |
| 5,796,052 A | 8/1998 | Christmann | |
| 5,839,566 A | 11/1998 | Bonnet | |
| 5,901,830 A | 5/1999 | Kalm et al. | |
| 5,984,078 A | 11/1999 | Bonnet | |
| 6,035,971 A | 3/2000 | Lindstrom et al. | |
| 6,213,395 B1 | 4/2001 | Dejaeger et al. | |
| 6,394,345 B1 | 5/2002 | Dejaeger et al. | |
| 6,668,979 B2 | 12/2003 | McQuaid et al. | |
| 6,772,575 B2 * | 8/2004 | Limousin | B65G 21/14 |
| | | | 198/459.5 |
| 7,121,398 B2 | 10/2006 | Affaticati et al. | |
| 7,168,555 B2 | 1/2007 | Peterson | |
| 7,386,472 B1 | 6/2008 | Bogat | |
| 7,395,918 B2 | 7/2008 | Thompson | |
| 7,490,712 B2 | 2/2009 | Hamers et al. | |
| 7,562,760 B2 | 7/2009 | Affaticati et al. | |
| RE41,717 E | 9/2010 | Dejaeger | |
| 7,967,112 B2 | 6/2011 | Kaplan et al. | |
| 8,479,912 B2 | 7/2013 | Layne | |
| 8,783,438 B2 | 7/2014 | Phan et al. | |
| 9,277,833 B1 * | 3/2016 | Vance | A47F 9/04 |
| 2004/0074823 A1 * | 4/2004 | Brust et al. | 209/586 |
| 2004/0262124 A1 | 12/2004 | Muchalov | |
| 2007/0187299 A1 * | 8/2007 | Valerio | 209/12.1 |
| 2009/0025344 A1 * | 1/2009 | Moske | B65B 5/061 |
| | | | 53/459 |
| 2009/0242356 A1 * | 10/2009 | Layne | 198/348 |
| 2013/0062159 A1 | 3/2013 | Fischer | |
| 2013/0146419 A1 | 6/2013 | Layne | |

FOREIGN PATENT DOCUMENTS

| | | |
|---|---|---|
| FR | 2370664 A1 | 6/1978 |
| JP | S4864664 A | 9/1973 |
| JP | 2001515830 A | 9/2001 |

\* cited by examiner

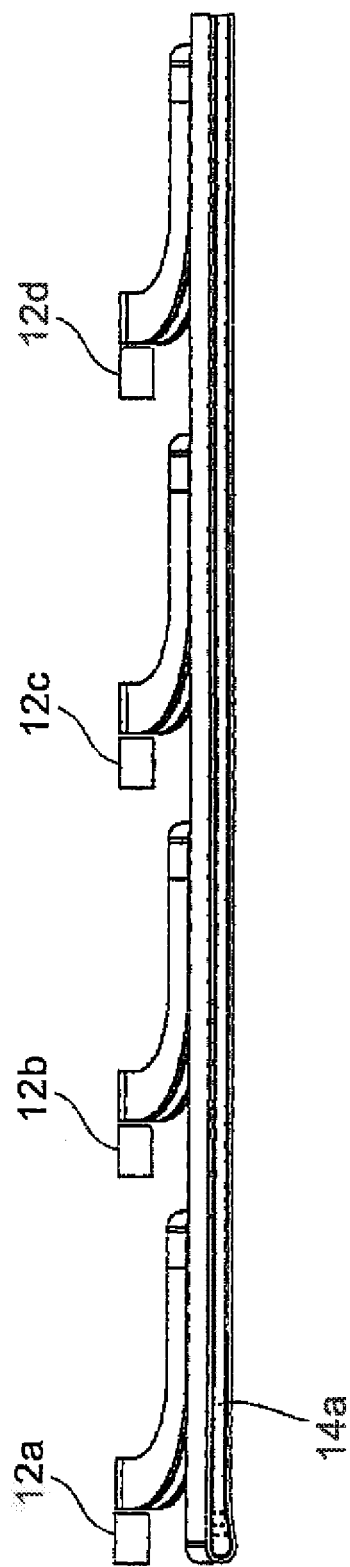
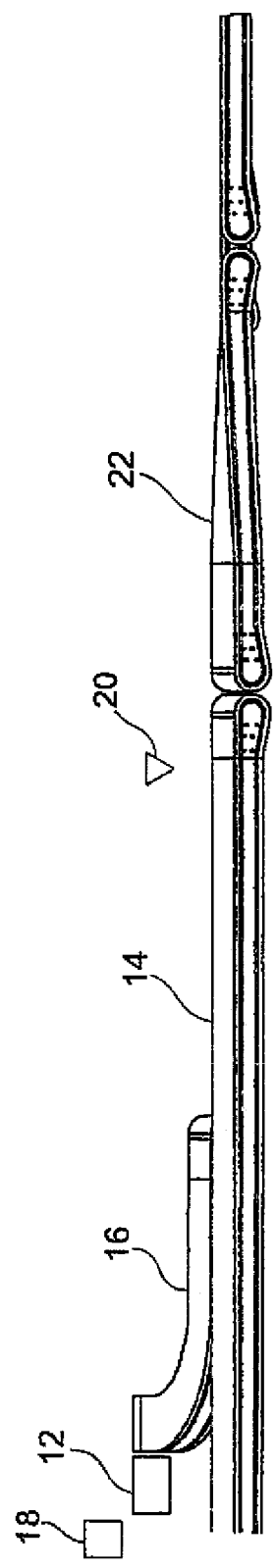
Fig. 2
Fig. 3

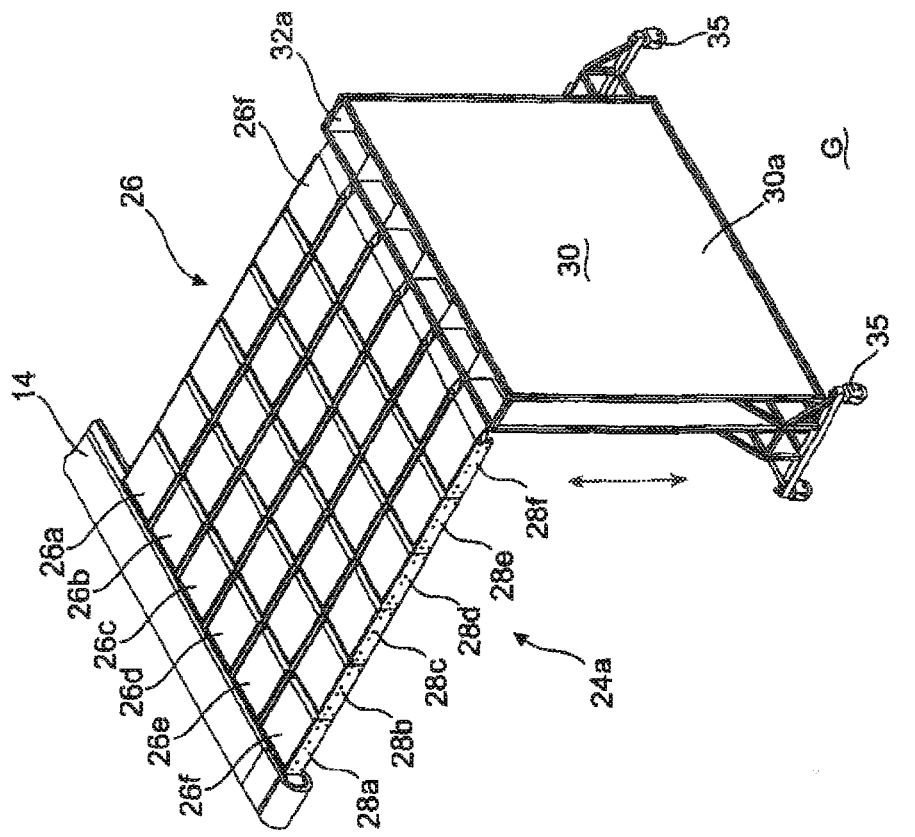
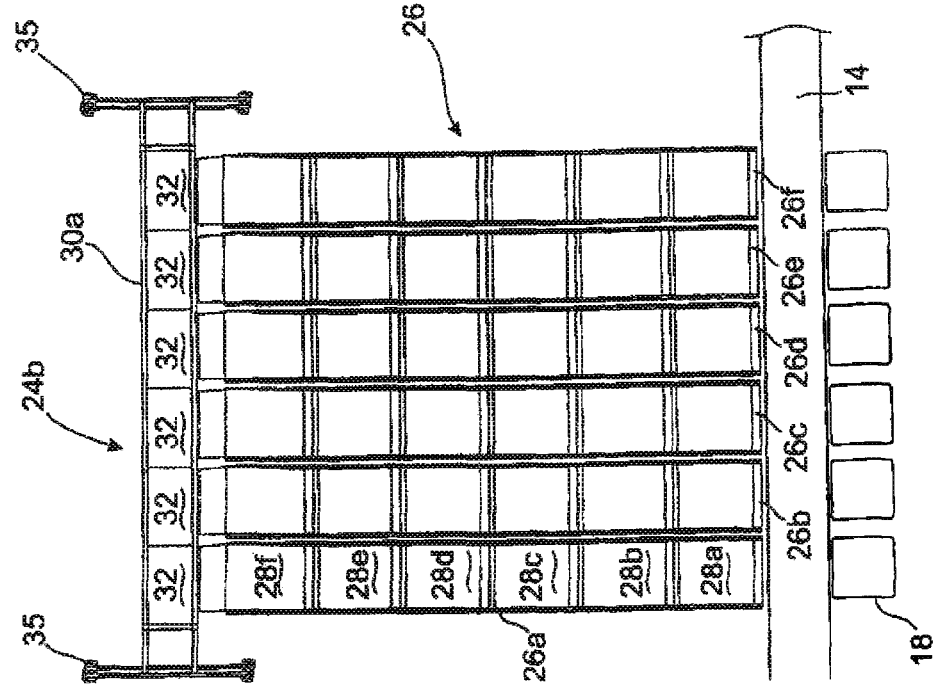
Fig. 6
Fig. 5

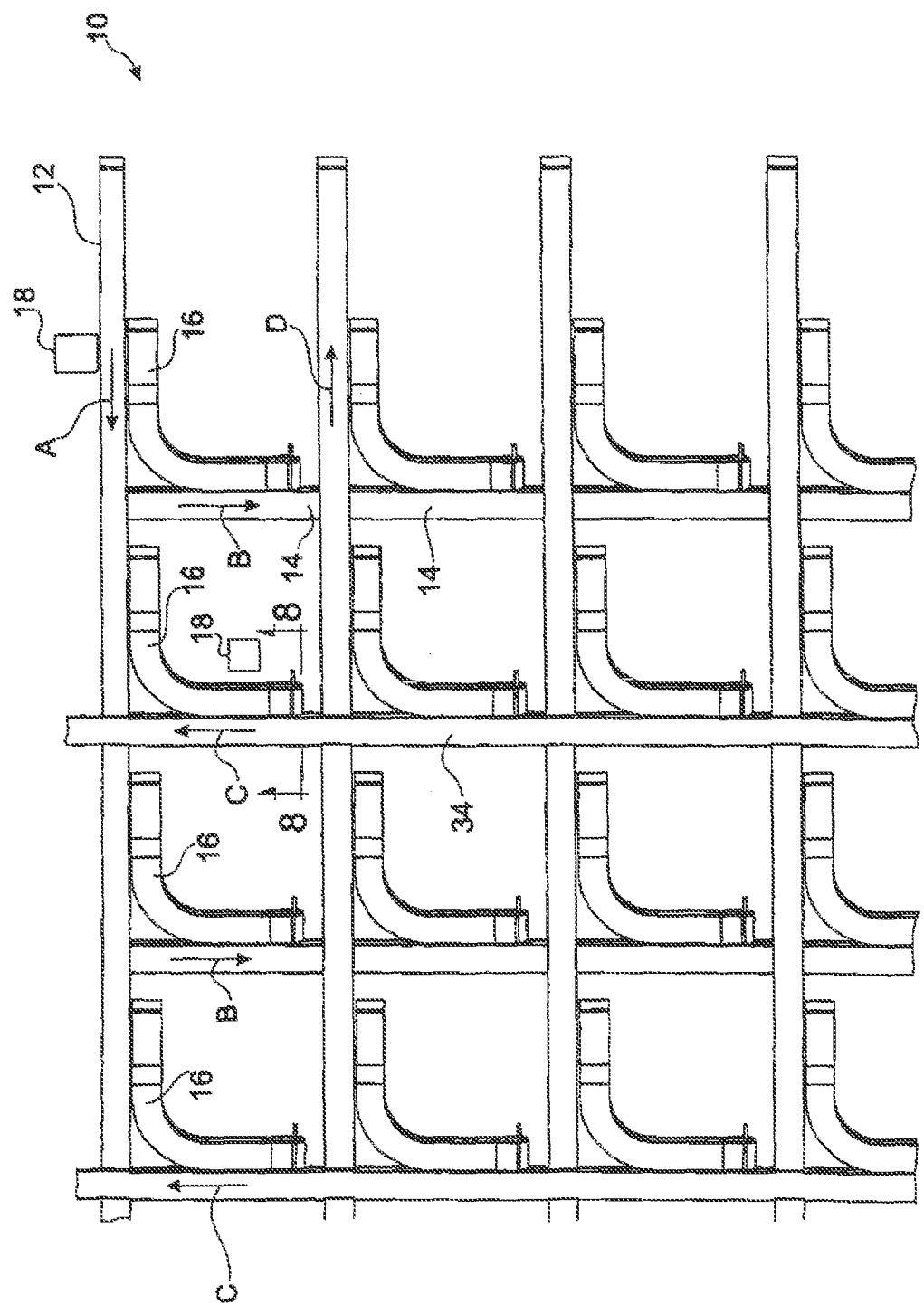

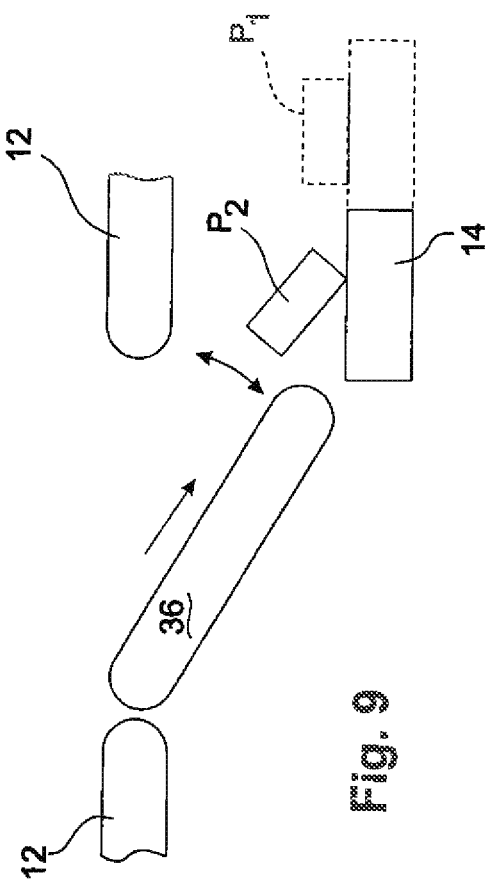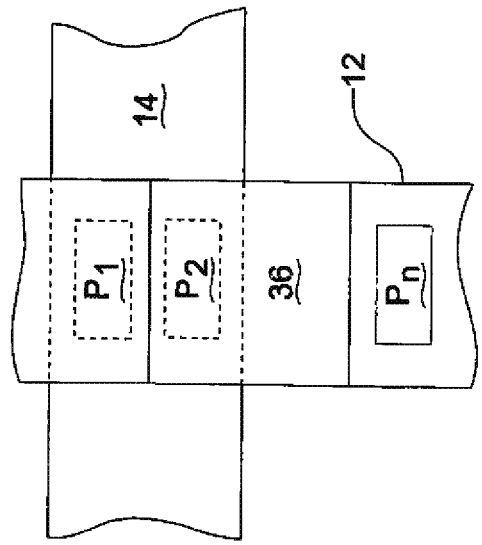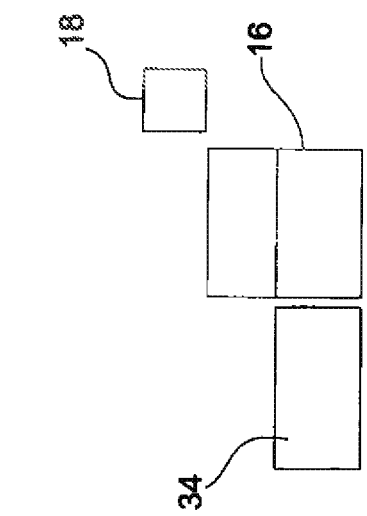

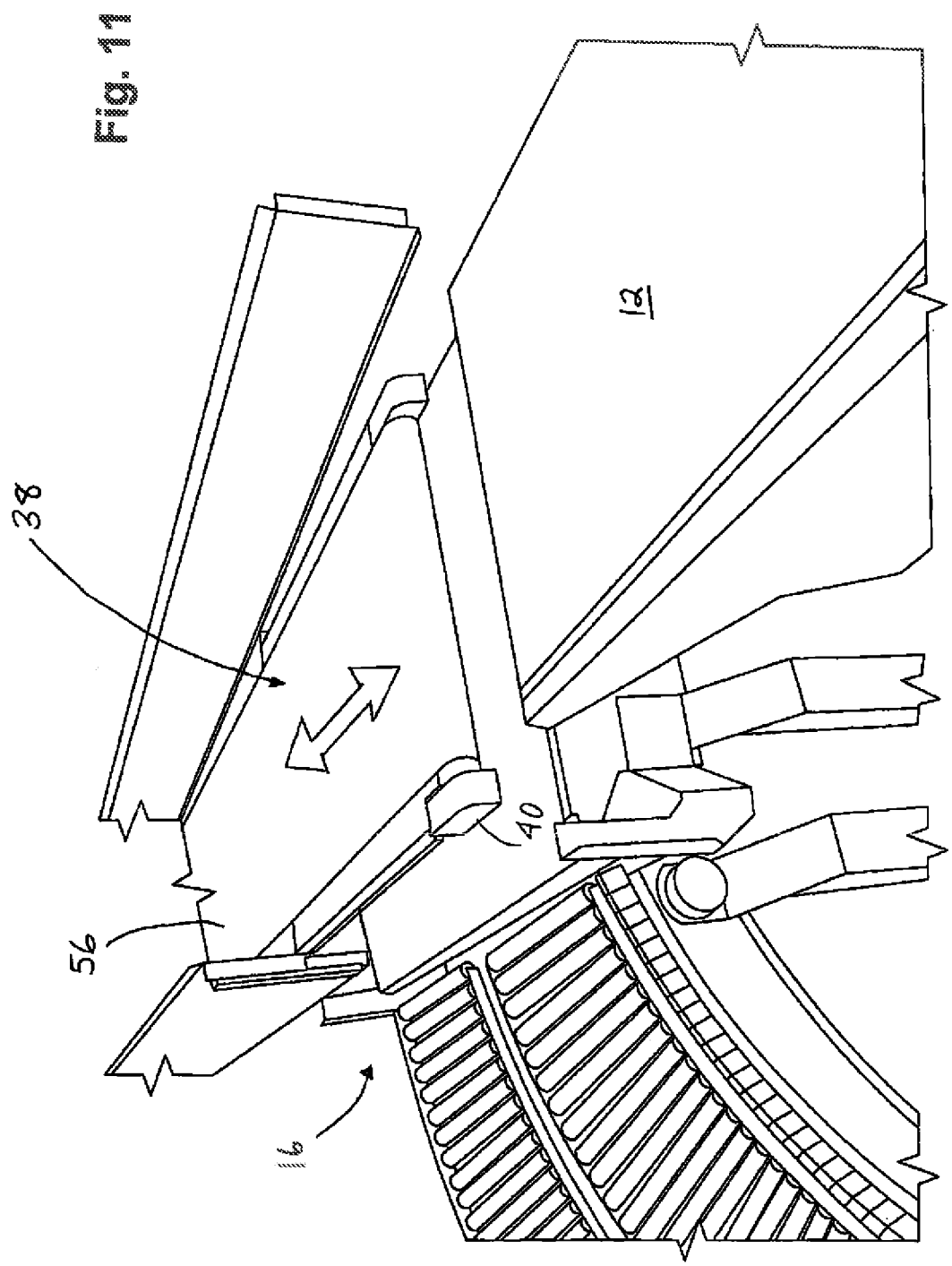

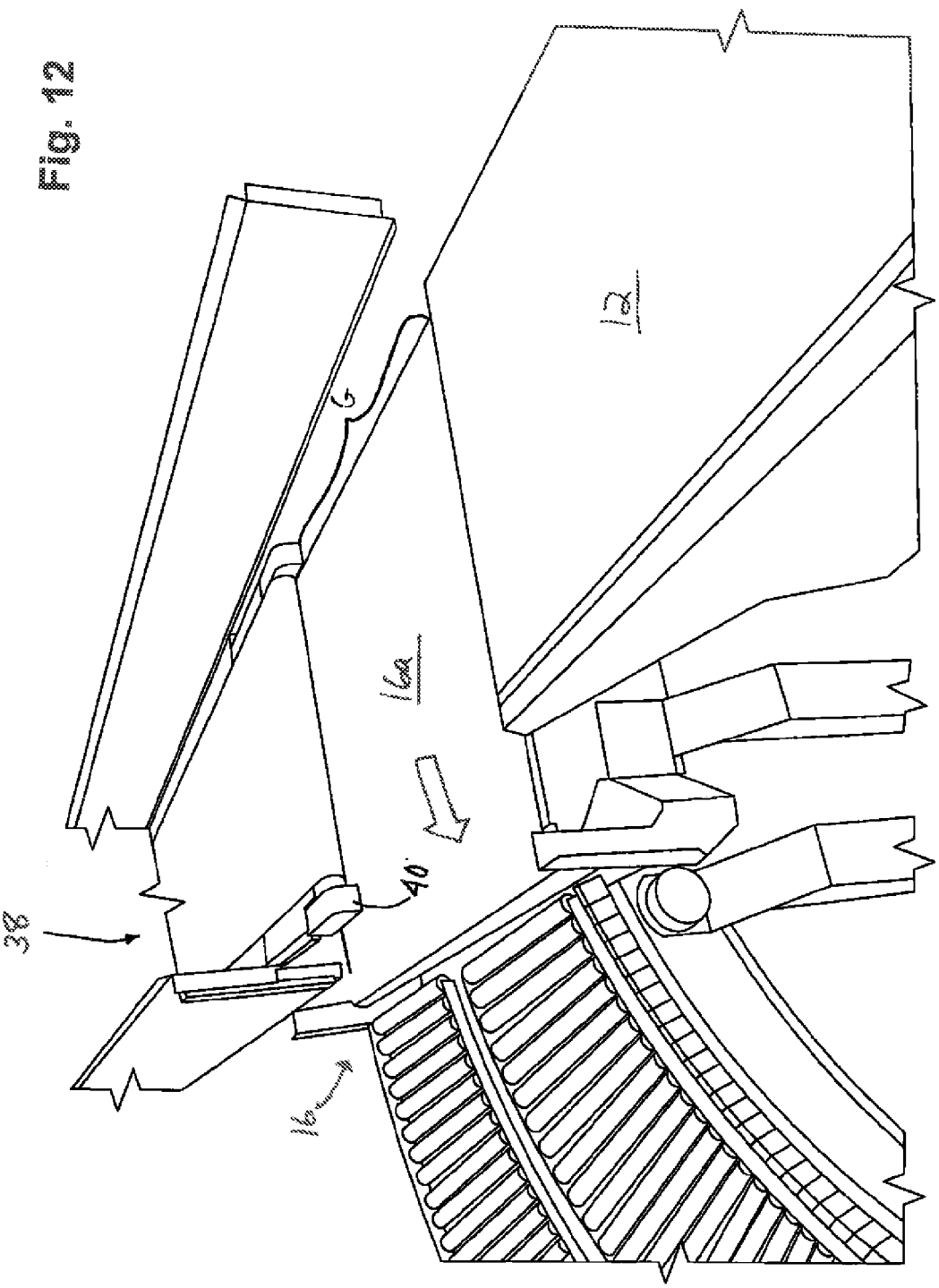

SORTATION SYSTEMS AND RELATED METHODS

This application incorporates by reference U.S. Provisional Patent Application Ser. No. 61/680,444, Ser. No. 61/594,821, Ser. No. 61/059,523, U.S. patent application Ser. No. 11/568,478, International Application PCT/US05/14970, U.S. Provisional Patent Application Ser. No. 60/567,411 and Ser. No. 60/618,853.

TECHNICAL FIELD

This disclosure relates to the article conveying arts and, in particular, to a system including conveyors for conveying or sorting articles.

BACKGROUND OF THE INVENTION

Over the past several years, the demand from businesses and individuals alike for second day and even overnight deliveries of articles, such as small to mid-sized parcels, packages and letters, has steadily increased. This demand is due, in part, to the prevalence of Internet and mail order shopping, which creates a similar need for an efficient and effective distribution system to deliver expediently the wares to a common carrier. Consequently, the need for methods and systems for quickly transporting, sorting and distributing this ever increasing volume of articles has similarly increased.

In fact, it is now general practice for common carriers to transport articles in the form of small to mid-sized packages or the like to a central sorting terminal or hub, where they are sorted according to selected parameters, such as having common regional destinations, and then delivered as a group. Once these destinations are reached, it is necessary to sort again to distribute articles in the group to their final destinations. To accomplish these tasks in the amount of time required to insure overnight delivery, the central as well as the regional sorting terminals or hubs must receive, sort and distribute hundreds of thousands of coded packages each day. Besides on the delivery side, a similar need exists on the distribution side, since purchasers are accustomed to receiving ordered items without significant delay.

Necessarily, the sortation systems used must be capable of processing the packages within these defined time parameters. Indeed, in response to the continuously increasing number of packages requiring next day or overnight delivery, the sortation systems must operate much faster and more efficiently than just a few years ago. It is also desirable for the systems to be more adaptable to accommodate fluctuations in need/demand, as well as simpler and less expensive.

Since as early as the 1960's, various package sortation systems have relied upon primitive "induction" type systems including an endless "loop" conveyor with mobile units that receive, transport and deposit packages at selected distribution stations. Specifically, U.S. Pat. No. 3,167,192 to Harrison et al. and U.S. Pat. No. 3,327,836 to Burt each disclose package sortation systems using tilt tray assembly units propelled by an endless conveyor chain. Timers and somewhat unreliable magnetic readers actuate tip solenoids to tilt the trays to one side, thus in theory allowing gravity to pull passively the packages from atop the trays upon reaching their destination. As should be appreciated, the speed with which such a system can process articles leaves much to be desired, especially since articles must potentially traverse the entire loop before reaching the desired destination.

A more recent sortation system described in U.S. Pat. No. 4,832,204 to Handy et al. integrates these prior art tilt tray sortation systems with more complicated scanning equipment and computer control in an attempt to improve overall system speed and efficiency. Despite the successful integration of these components into a supposedly more modern and state of the art system, but with much greater complexity and cost, the system of the '204 patent still fails to improve the basic sortation apparatus and methods. In essence, package delivery customers are calling for a move away from the continued reliance on the complex and expensive tilt tray systems that rely primarily on gravity transfer, such as in the '204 patent, and at the same time demanding significant increases in the overall speed, efficiency and adaptability of the sortation system.

In recent times, "tilt tray" sorters have been replaced by allegedly more efficient "cross belt" sorters. One version of this type of sortation system includes an endless train of driven cars pass operator-controlled feed conveyors used to deliver a single article for transport around the loop. When the car reaches the desired destination for the article, an onboard conveyor actuates to eject the article to a takeaway conveyor. An early example of this type of system appears in U.S. Pat. No. 3,977,513 to Rushforth, and a more modern example appears in the September 2003 issue of *Modern Material Handling* magazine (incorporated herein by reference).

Despite the industry-wide movement toward this type of sorting system, it still suffers from similar problems with efficiency. Just like in the tilt tray systems, only a single article can be loaded onto a selected car at a given instant in time. This serves as a significant limitation on the total throughput possible, and requires operating many such systems simultaneously to keep up with the demand. The use of individual cars with cross belts, which are typically complicated, also presents problems from a reliability and maintenance standpoint.

Furthermore, past sortation systems cannot sort articles continuously, since various events demand downtime. For example, articles sometimes mis-introduced into the system must be retrieved and removed. Likewise, completing the previous sorting operation before introducing the next group of articles requires introducing any articles accidentally left out from the previous operation, which results in costly downtime. Running two induction-type sortation systems in parallel alleviates the problem in part, but this will not necessarily reduce the cost. The existing systems also tend to occupy a great deal of floor space, which may make this impossible to accomplish using a given facility.

Thus, an important aspect of the effort to improve this technology involves providing a sortation system and related method capable of transporting, sorting and distributing the increasing volume of such articles in a more efficient manner. Increased efficiency and adaptability of use, as well as lower cost and maintenance, should advantageously result without a concomitant increase in complexity.

SUMMARY

A conveyor system is provided for intended use in conjunction with the sorting of articles. In one aspect the system comprises a first conveyor comprising a transpositor. A plurality of conveyor lanes are provided, each arranged for receiving one or more articles deposited from the transpositor. The adjacent conveyor lanes may be formed by a divider, or by a space or gap. A first conveyor lane may be formed by a first conveyor and a second conveyor lane may be formed by a second conveyor. The first and second conveyors may be adapted for conveying objects in the same or different directions, and the plurality of lanes may be formed on a single conveyor. A controller may also be provided for controlling the movement of the transpositor to deliver at least one article to a selected one of said conveyor lanes. At least one conveyor including at least one of the lanes is height-adjustable relative to the transpositor. The first conveyor may also include a second transpositor.

Another aspect of this disclosure relates to a conveyor system for intended use in conjunction with the sorting of articles, comprising a first conveyor comprising a transpositor, and a second conveyor for receiving at least one article from the transpositor. The second conveyor is adapted for selectively conveying the article in a first direction or a second direction. An actuator may be provided for raising and lowering the second conveyor relative to the first conveyor. The second conveyor may comprise one of a tilt tray or an endless belt or chain.

A further aspect of this disclosure pertains to a conveyor system for intended use in conjunction with the sorting of articles. The system comprises a first conveyor and a second conveyor for receiving at least one articles from the transpositor. An actuator is provided for raising and lowering the second conveyor relative to the first conveyor, and a controller is also provided for controlling the actuator to raise or lower the second conveyor based on a characteristic of the article. The arrangement may also include a sensor for sensing the characteristic of the article, such as size, height, weight, length, or any combination of the foregoing.

Still another aspect of the disclosure relates to an apparatus for conveying an article. The apparatus comprises a conveyor including a transpositor for supporting the article in a fully extended position and capable of reaching a retracted position. An actuator is also provided for actuating the transpositor to retract to a position between the fully extended position and the fully retracted position.

Yet a further aspect of the invention disclosure is transpositor including a controller for controlling the retraction of the transpositor to a plurality of retracted positions for depositing an article at a selected location corresponding to one of the plurality of retracted positions.

A further aspect of the disclosure is an endless belt or chain conveyor for conveying an article, said conveyor carrying at least one slide for slidably conveying an article being conveyed from the belt or chain.

A related aspect of the invention is a conveyor adapted for being driven for conveying articles in a first direction or a second direction, and connected to an actuator for raising and lowering the conveyor.

A further aspect pertains to a transpositor conveyor including one or more motorized drive rollers.

The disclosure also relates to a system for sorting articles. The system comprises a first conveyor for conveying the articles in a conveying direction, the first conveyor including a transpositor, a second conveyor for receiving a first article from the transpositor and conveying the first article in a first direction transverse to the conveying direction, and a third conveyor for receiving a second article from the first conveyor. The third conveyor is adapted for conveying the second article in a second direction generally opposite the first direction. One or both of the second and third conveyors may comprise tilt-trays or bi-directionally drivable endless belts or chains. The first conveyor may also comprise a second transpositor, and the third conveyor may be positioned below the second transpositor.

Related methods are also disclosed. For one, a method for conveying articles comprises retracting a transpositor to a first position for depositing a first article on a first conveyor, and retracting the transpositor to a second position for depositing a second article on the first conveyor. The retracting steps may occur substantially simultaneously.

Another disclosed method for conveying articles involves providing a first conveyor including a transpositor for dropping an article onto a second conveyor, and then raising or lowering the second conveyor relative to the transpositor to control the drop height of the article.

A further disclosed method of sorting articles includes conveying at least one article in a conveying direction along a first conveyor including a transpositor; delivering the article to a second conveyor by actuating the transpositor; and selectively actuating the second conveyor to convey the article in a first direction generally transverse to the conveying direction or a second direction generally opposite the first direction.

Still another method of sorting articles comprises conveying a first article in a conveying direction along a first conveyor including a transpositor; delivering the article from the transpositor to a second conveyor for conveying the article in a first direction transverse to the conveying direction; and delivering a second article in the conveying direction to a third conveyor extending in a second direction generally opposite the first direction. The step of delivering the second article comprises depositing the article from a second transpositor to the third conveyor.

Another aspect of this disclosure is a transpositor conveyor, comprising a base supporting a bed, said base and bed together supporting a conveyor belt, and at least one motor driven roller for moving one of the bed or the conveyor belt. The conveyor may further include a first motor driven roller for moving the bed and a second motor driven roller for moving the conveyor belt. The conveyor may also include a plurality of idlers for supporting the conveyor belt, at least one of the idlers being connected to the bed. A toothed belt may be provided for moving the bed between an extended position and a retracted position relative to the base, and the bed may be connected to the belt.

Yet another aspect of this disclosure relates to an apparatus for conveying objects, comprising a conveyor including an endless belt or chain for supporting the objects being conveyed, a base for supporting the conveyor; and at least one hinge for connecting the conveyor to the base. The conveyor may comprise a frame for supporting the belt, and wherein the frame is connected to the conveyor. The conveyor may comprise a transpositor conveyor, and may further include at least one support for supporting the conveyor in a titled condition relative to the base. A coupler may also be provided for releasably coupling the support with the conveyor. The hinge may include a pin having a longitudinal axis generally aligned with a conveying direction of the conveyor, and the apparatus may include a plurality of hinges.

A further aspect of the invention relates to an apparatus for conveying objects. The apparatus comprises a conveyor including an endless belt or chain for supporting the objects being conveyed and a base for supporting the conveyor. A first hinge is provided for connecting the conveyor to a first side of the base, and a second hinge is provided for connecting the conveyor to a second side of the base. The first hinge may be generally opposite the second hinge.

The disclosure also provides for an apparatus for conveying objects, comprising a conveyor including an endless belt or chain for supporting the objects being conveyed. A base is provided for supporting the conveyor. A support is also provided for supporting the conveyor in a tilted condition relative to the base. The support may be pivotally mounted to a frame of the conveyor at one end and captured in a channel formed in the base at the other end. The apparatus may also include a coupler, such as a hinge, a magnet, or both, for coupling the conveyor to the base. A retractable stripper may also be provided for engaging the support in a collapsed condition of the conveyor relative to the base.

A related method of operating a transpositor conveyor including a retractable bed at least partially supporting a conveyor belt, comprises moving the bed or the belt using a motor driven roller. The moving step may comprise driving the conveyor belt with a first motor driven roller and driving the retractable bed using a second motor driven roller.

A method of operating a transpositor including an endless belt or chain for conveying at least one article or depositing the article on a takeaway conveyor according to the disclosure may also involve disconnecting the transpositor from a base, and lifting the transpositor relative to the base. The disconnecting step may comprise releasing a first hinge along a first side of the conveyor, and the lifting step comprises pivoting the transpositor about a second hinge along a second side of the conveyor. The method may further include the step of providing a support leg for holding the transpositor in a tilted condition relative to the base, as well as temporarily coupling the support leg to the transpositor.

A further aspect of the disclosure is a method of conveying articles, comprising determining a dimension of at least one article being conveyed in a conveying direction; and retracting a conveyor for conveying the article an amount in the conveying direction based on the determined dimension of the article being conveyed. The method may further include extending the conveyor for conveying a second article to a downstream conveyor.

A related method involves operating a transpositor including a retractable bed, comprising sensing a dimension of an article being conveyed in a conveying direction, and providing an actuator for actuating the retractable bed to move an amount in the conveying direction based on the sensed dimension of the article.

Still another method relates to a conveying system for conveying at least one article having a dimension, comprising a transpositor for conveying the at least one article, a sensor for sensing the dimension of the at least one article, and an actuator for actuating the transpositor based on the sensed dimension of the article. The actuator may be adapted for moving a retractable bed of the transpositor to deliver the at least one article to a takeaway conveyor.

The disclosure relates to a conveying system for conveying at least one article, comprising a transpositor for conveying the at least one article, an actuator for actuating the transpositor, and a sensor for sensing an operating condition and halting the transpositor upon sensing an unexpected condition. The actuator may produce a pulse train, the sensor receives the pulse train as the operating condition, and an interruption in the pulse train during a forward movement of a retractable bed of the transpositor constitutes the unexpected condition. An increase in a current to the actuator sensed by the sensor may constitute the unexpected condition. The system may further include an emergency stop, and wherein the actuation of the emergency stop constitutes the unexpected condition. The stop may comprise a pull cord adjacent a perimeter of the conveying system.

BRIEF DESCRIPTION OF THE DRAWINGS

FIG. 2 is a partially cutaway side view of the system of FIG. 1;

FIG. 3 is a partially cutaway side view of a takeaway conveyor associated with the system of FIG. 1;

FIG. 5 is a partially cutaway top plan view of one embodiment of a sub-sorting station;

FIG. 6 is a partially cutaway perspective view of a sub-sorting station;

FIG. 7 is a partially cutaway plan view of yet another embodiment of the sortation system, including three levels of conveyors;

FIG. 8 is an end view of two of the conveyors forming part of the system of FIG. 7;

FIG. 9 is a partially cutaway side schematic view of one possible means for transferring articles between two conveyors;

FIG. 10 is a partially cutaway top plan view of a transferring means similar to the one shown in FIG. 9;

FIGS. 11-18 illustrate a further embodiment of a sortation system including the details of a transpositor conveyor as a transferring means.

DETAILED DESCRIPTION

Figure 1:
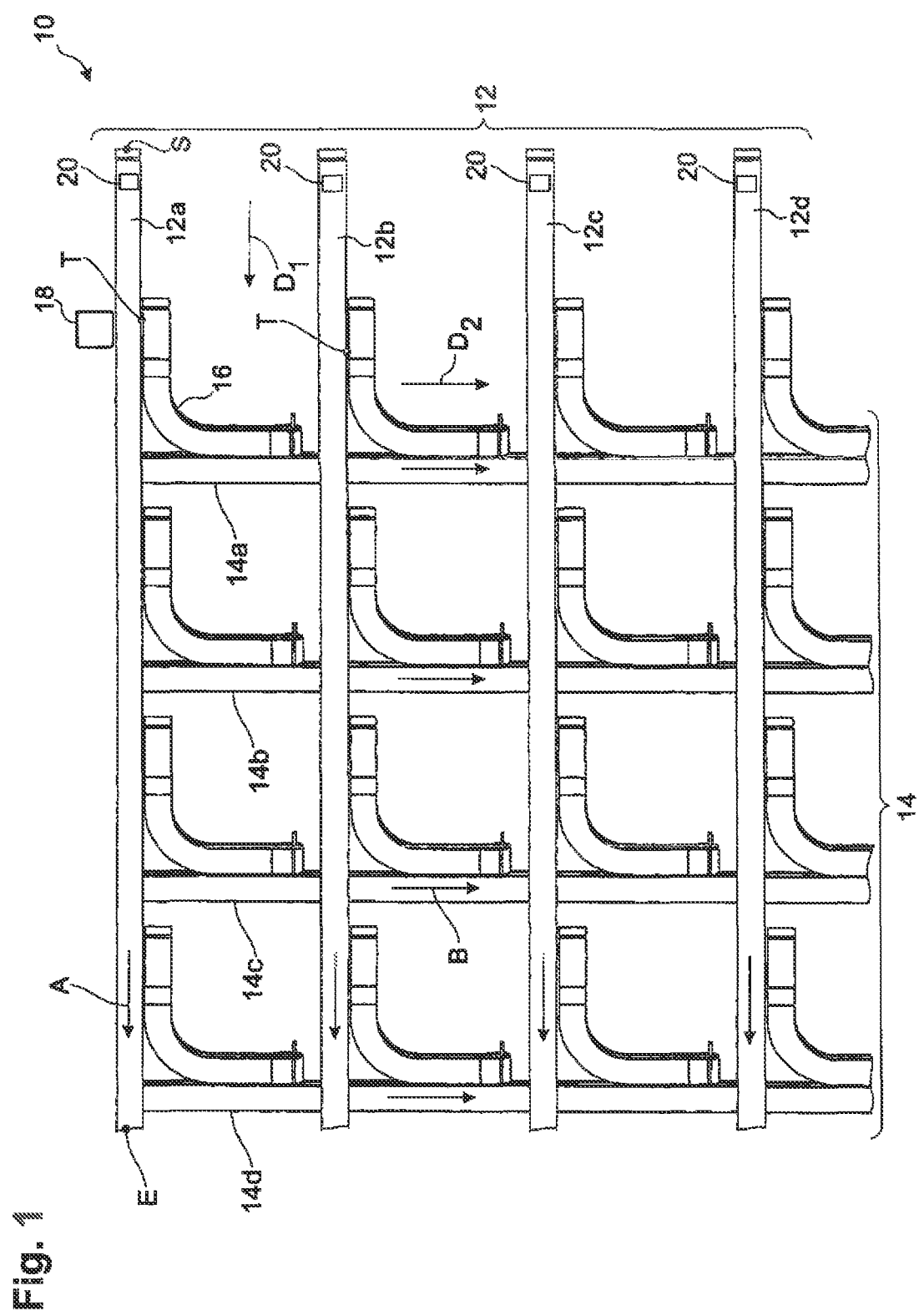
FIG. 1 is a partially cutaway plan view of the sortation system forming one aspect of the invention.

With reference to FIG. 1, one possible embodiment of a sorter system 10 forming one aspect of the invention is schematically illustrated. As illustrated, the sorter system 10 may comprise a "matrix" formed of a plurality of intersecting belt or chain conveyors 12, 14 extending in different directions. Each conveyor 12, 14 is of the endless belt or chain type, and thus provides a substantially continuous conveying surface for articles (as contrasted from tilt tray sorters, which unlike belt or chain conveyors create a substantially interrupted conveying surface). Although certainly not a requirement, a preference exists for the types of endless belt or chain conveyors manufactured and sold by Span Tech, LLC under THE DESIGNER SYSTEM® trademark, the details of which are found in U.S. Pat. Nos. 4,953,693 and 5,031,757 (which are incorporated herein by reference).

As a result of this arrangement, each intersection represents a possible or potential location or point T for transferring an article between the associated conveyors 12, 14. Consequently, two or more selected articles conveyed along different infeed conveyors 12 extending in one direction may undergo simultaneous sortation and delivery to one or more of the takeaway conveyors 14 extending in a different direction and associated with a particular destination (such as a delivery truck, receiver, or sortation subsystem). By creating a system 10 including numerous infeed and takeaway conveyors 12, 14 extending in both directions and selectively moving articles between them at the desired intersections, article sortation can thus be achieved in a highly efficient and effective manner, and one heretofore unknown using prior types of endless loop induction systems.

In the embodiment shown in FIG. 1, the infeed and takeaway conveyors 12, 14 of the system 10 extend generally perpendicular to each other (note first and second orthogonal directions $D_1$ and $D_2$) in a spaced apart fashion and thus form a "regular" grid (e.g., 4×4, although an irregular grid (2×3, 4×5, 40×50, etc.) could easily be used as well). In this particular illustrated embodiment, the matrix system 10 comprises: (1) a first set or series of infeed belt or chain conveyors 12a-12n extending in a first longitudinal direction (four conveyors shown, labeled 12a-12d); and (2) a second set or series of takeaway belt or chain conveyors 14a-14n extending in a second longitudinal direction transverse to the first direction (four shown, labeled 14a-14d). These infeed and takeaway conveyors 12, 14 preferably each associate with a distinct starting point S and ending point E (i.e., they are linear or straight and independent from each other, as contrasted with known prior art induction systems using an endless loop conveyor with a continuous train of cars to effect sortation). Preferably, the conveyors 12, 14 in each series extend generally parallel to each other, including in the portion comprising the system 10, and move in the same direction (note arrows A and B in FIG. 1) along an endless path.

As perhaps best shown in FIG. 2, the infeed conveyors 12a-12d generally lie in a first horizontal plane above the secondary or takeaway conveyors 14a-14d, which are in a second, different horizontal plane. This provides the system 10 with multiple layers, levels, or tiers of conveyors 12, 14. In one proposed embodiment, the infeed conveyors 12a-12d all lie above the takeaway conveyors 14a-14d. However, as indicated in the description that follows, this arrangement may be reversed or, alternatively, more than two layers of intersecting conveyors may be used, with some above and some below each other (see FIG. 7). Although not shown, it should be appreciated that the conveyors 12, 14 are all preferably supported above the ground, such as in the manner disclosed in the '693 or '757 patents.

In accordance with another aspect of the invention, means for transferring at least one selected article between the conveyors may be provided at or near each intersection between an infeed conveyor 12 and a takeaway conveyor 14. In the embodiment of FIG. 1, the means for transferring comprises a transfer conveyor 16. The transfer conveyor 16 may comprise a generally L-shaped, driven, endless belt or chain conveyor, oriented such that the articles transferred onto it move from the plane of the corresponding infeed or first conveyor, such as conveyor 12a, to the corresponding takeaway or second conveyor, such as conveyor 14a. The use of an L-shaped transfer conveyor 16 as illustrated may be desirable in situations where the articles have a direction of elongation, since the article upon reaching the takeaway conveyor 16 will normally assume the exact same orientation it had on the infeed conveyor 12 (which may have been selected by the person placing the articles to ensure that an indicia such as a bar code was in a proper position for being read). Using a linear or passive transfer conveyor 16, such as a straight endless conveyor or a passive slide/chute, is also possible.

To move one or more of the articles selected for transfer onto the conveyor 16, a diverter 18 may be used. The diverter 18 functions to divert or move a selected article onto the transfer conveyor 16, and may thus comprise any structure for performing this function. For example, the diverter 18 may comprise a retractable arm, gate, lug, or guide for moving into the path of a selected article on the associated infeed conveyor 12 and directing it onto the transfer conveyor 16. The diverter 18 may comprise a picker, kicker, pusher, or like motive device.

As should be appreciated from the foregoing, the particular means used to move any selected article between the conveyors 12, 14 could vary depending on the arrangement used and any special needs (e.g., conveying delicate articles versus books). Likewise, instead of an active transfer conveyor 16, the transferring means for example may comprise a pusher, kicker, ejector, lifter, elevator, actuator or combinations thereof for transferring an article from one conveyor to another, including in possible combination with a chute or conveyor. Although not preferred, the possibility of using a manual "pick and place" operation at each intersection exists (which especially helps when one or more of the takeaway conveyors are above the infeed conveyors). In any case, selected articles reliably make their way from the infeed conveyors 12 to at least one of the takeaway or secondary conveyors 14, thereby effecting the desired sortation.

Turning back to FIG. 2, the portion or leg of the L-shaped transfer conveyor 16 adjacent to and generally aligned with the takeaway conveyor 14a may be tilted relative to a horizontal plane. Advantageously, this tilting may cause an article being conveyed along the transfer conveyor 16 to slide automatically onto the associated takeaway conveyor 14 without the need for active engagement. A passive diverter (not shown), such as a fixed gate, may also be provided at or near the end of this leg of the transfer conveyor 16 to help insure that any articles that do not slide off are ultimately diverted. However, instead of a tilted arrangement with a passive diverter, an active diverter may be provided for moving articles from a non-tilted section of conveyor 16.

In order to insure that proper selection for transfer is achieved (and thus sorting provided), articles approaching on the infeed conveyor 12 may be identified visually by an operator or using well-known types of "machine vision" scanning technology (e.g., reading a bar or other code using an adjacent (e.g., overhead) reader 20)). The article spacing on each infeed conveyor 12 may be such that only one selected article is transferred at a time. However, unlike in prior systems utilizing tilt trays running in endless loops in which only a single article may be processed at a given instant in time, articles for delivery to common destinations may simultaneously transfer from different infeed conveyors 12a-12d to one or more of the takeaway conveyors 14a-14d. More efficient sorting operation and a potential multi-fold increase in throughput without a concomitant increase in conveying speed results.

In the case where all articles divert or transfer onto takeaway conveyors 14a-14n, then the infeed conveyors 12a-12n may simply terminate. However, an alternative approach extends one or more of the infeed conveyors 12a-12n such that articles not transferred ultimately reach a downstream location for further processing. For example, an article remaining on one infeed conveyor 12a, such as the result of inadvertent placement, and not actually needed to fill an order made (and thus not transferred to any of the takeaway conveyors 14a-14n), may reach a "reject" bin (not shown). Alternatively, such articles may collect on a single return conveyor (not shown) extending back to an associated storage area.

Another alternative involves delivering the articles remaining on the infeed conveyors 12a-12n to another sorter system, including possibly another matrix system (not shown). In the latter case, a "single row" matrix may include a single endless belt or chain infeed conveyor having a continuous conveying surface and a plurality of takeaway conveyors intersecting this infeed conveyor. This arrangement may work well in situations where the articles are all intended for delivery to different addresses in the same city or zip code or otherwise share a common characteristic.

Turning to FIG. 3, each takeaway conveyor 14a . . . 14n in the system 10 may also orient at an angle, or "tilt," relative to the horizontal plane in a direction transverse to the conveying direction, either at the transfer point or at a downstream location. Such tilting causes transferred articles to slide down along the corresponding conveying surface to a known edge, which may be defined by a side guard (not shown) adjacent to the associated takeaway conveyor 14. As should be appreciated, this tilting generally turns the articles to achieve a particular orientation (e.g., short end leading, in the case of an elongate article) for a desired operation (e.g., reading a bar code, such as using an adjacent reader 20). Once the operation is complete, it may also be desirable as shown in FIG. 3 to provide a portion of the conveyor 14 with a "twist" section 22 that returns the article to a position parallel with a horizontal plane before undergoing further processing.

Exemplary uses of the matrix sorter system 10 described above are myriad. One such use involves a facility for delivering articles such as books from a storage location in a warehouse to a particular destination (such as to a packaging area or loading dock for shipping to retail stores). In particular, each infeed conveyor 12 associates with a grouping of books within the warehouse. A "pick to light" system visually identifies to a "picker" the books at the storage location in the warehouse (such as an adjacent shelf or pallet) to place on the infeed conveyor 12. Pickers may thus place individual books on different infeed conveyors 12 running in parallel or alternatively on a single conveyor ultimately dividing into several infeed conveyors associated with system 10.

In either case, the books on each infeed conveyor 12a . . . 12n upon approaching the system 10 undergo identification, either by an operator or a machine scan (in which case, a person positioned upstream of the scanning location may ensure the books are in the proper orientation and singulated (e.g., separated by a certain minimum distance in the conveying direction)). Each takeaway conveyor 14 may be associated with a common parameter or characteristic shared by some books (e.g., those going to a particular destination, company/individual, distribution center, store, sorting location, etc.). Once identified, the corresponding books on the various infeed conveyors 12 are identified and then transferred to the correct takeaway conveyor 14 to effect sortation in the desired fashion using the above-described transfer techniques (which, again, are preferably automated, but may instead be manual or semi-automated).

Downstream along the takeaway conveyor 14, the books may undergo further sorting, if necessary (such as if those having different destinations are transferred). Of course, placing persons along this conveyor 14 to identify and move the books to packages, bins, bags, carriers, etc. works for this purpose. Alternatively, and as discussed further below, this "sub" sorting may instead use an automated system, such as one that detects and routes each book to an appropriate takeaway conveyor for delivery to a receiver (e.g., bag, box or bin) representing an order.

Figure 4:
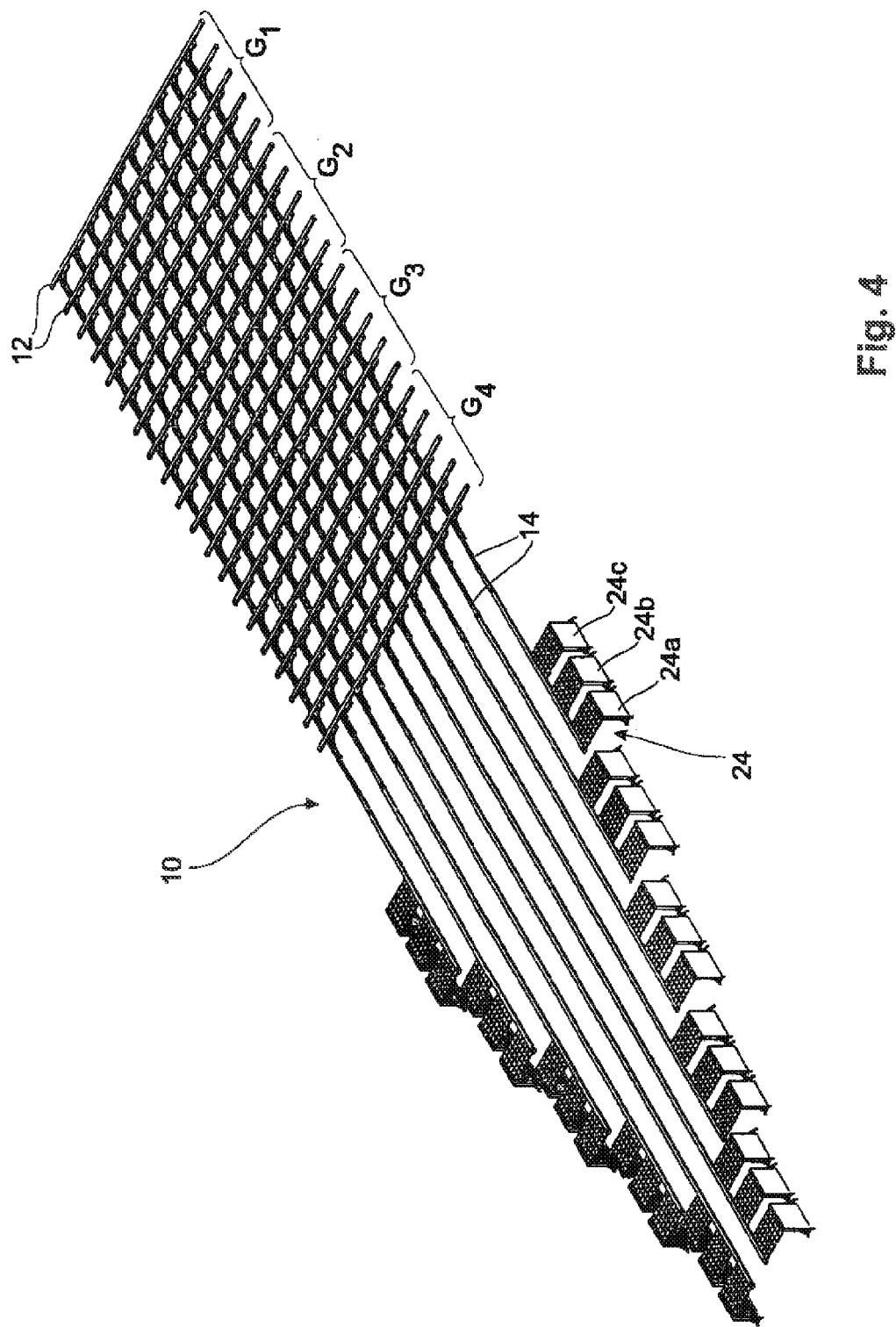
FIG. 4 is a perspective view showing another embodiment of the sortation system.
Figure 13:
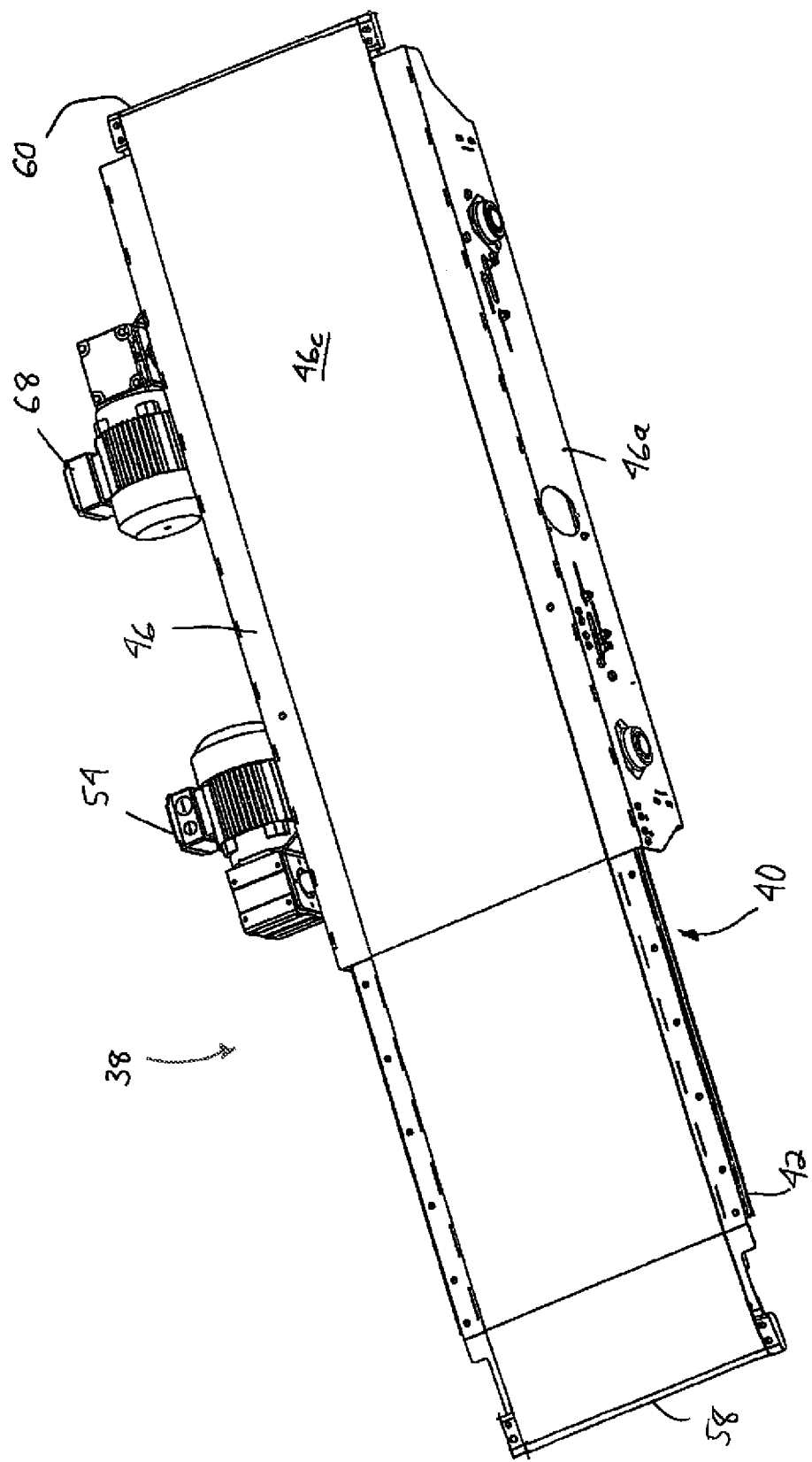
Figure 14:
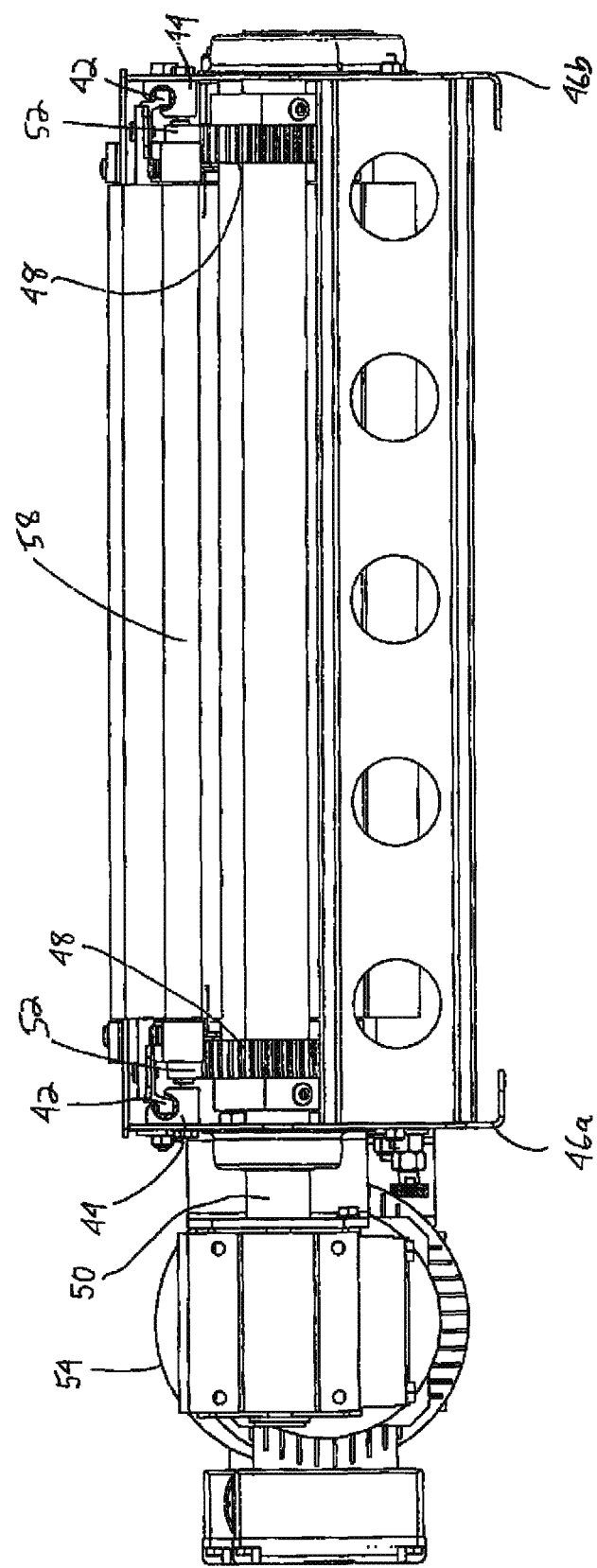
Figure 15:
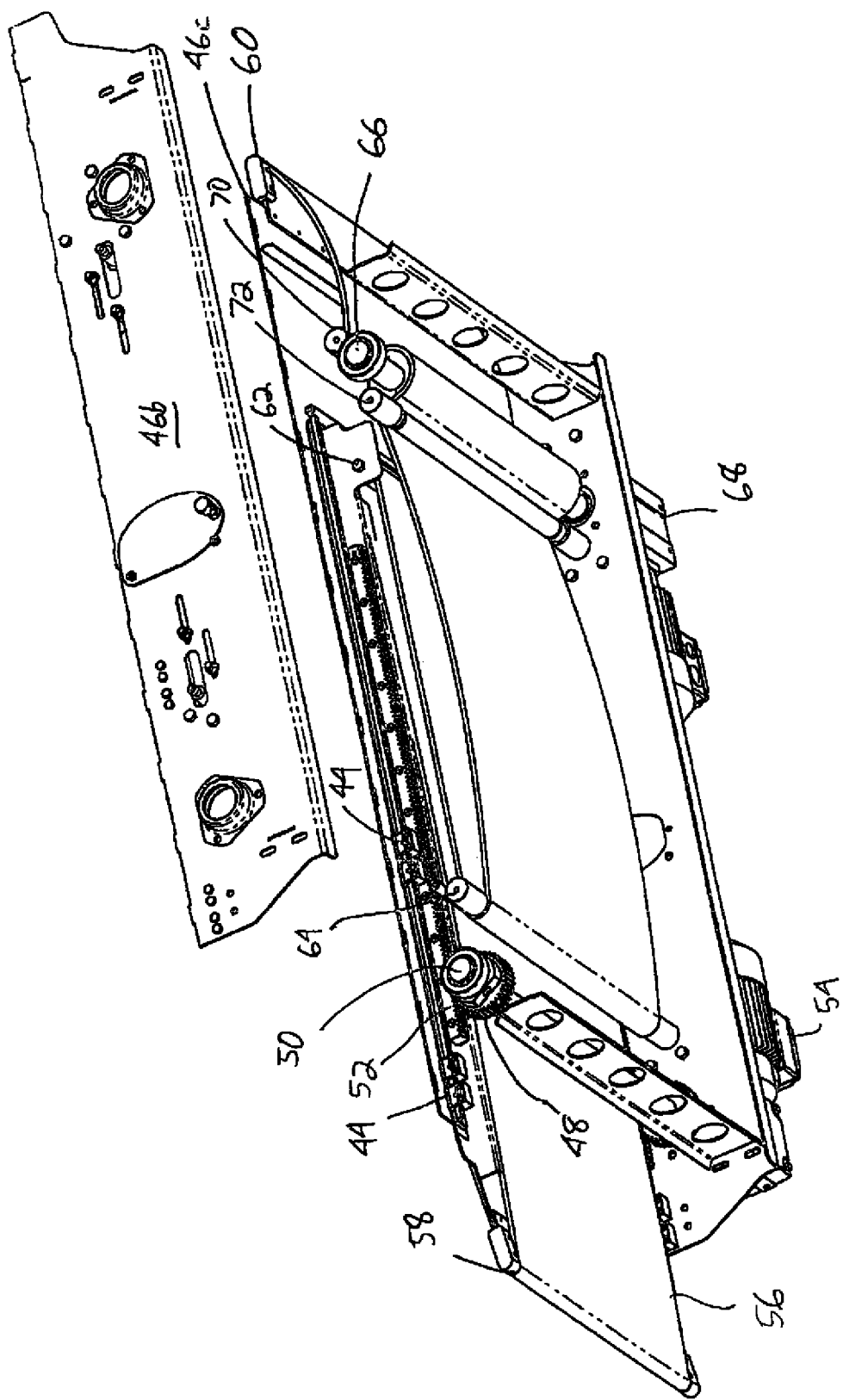

An example of a particular sub-sorting arrangement useful with a matrix sorter system 10 essentially as described above is shown in FIGS. 4-6. FIG. 4 shows that the overall system 10 comprises a plurality (twenty) infeed conveyors 12 extending in a first direction and a plurality (ten) of takeaway conveyors 14 extending in a second direction. The takeaway conveyors 14 generally lie in a common horizontal plane, but are positioned below the infeed conveyors 12. Each of the ten takeaway conveyors 14 associates with one or more sortation "stations" 24. In the illustrated embodiment, three such stations 24a, 24b, 24c lie spaced from each other in the conveying direction and on the same side of a common takeaway conveyor 14 (which it should be appreciated may be a distinct conveyor from the one forming part of the basic system 10).

Turning to FIGS. 5 and 6, it can be seen that each station 24 comprises at least one and preferably a plurality of transverse conveyors 26 for delivering the articles from the associated takeaway conveyor 14 to a temporary storage location corresponding to articles sharing a common characteristic (e.g., those comprising a particular order, or those going to a particular country, region, state, zip code, city, town, village, address, etc.). In the embodiment shown, six such substantially continuous conveyors 26a-26f extend in parallel. Each conveyor 26a-26f may comprise an "indexing" conveyor including a plurality of individual conveyor segments arranged in series (with six segments 28a-28f shown for purposes of illustration only), which together define each continuous conveyor. A common electric motor (not shown) may drive these segments 28a-28f at the same speed and in the same direction, or alternatively separately actuated motors may drive them independent of each other. As indicated in FIG. 5, a selected article may be transferred to the leading segment 28f of each indexing conveyor 26a-26f from the takeaway conveyor 14 using an associated diverter 18.

A sensor (not shown) associated with each conveyor segment 28a-28f may detect the presence of an article thereon. A conventional "photoeye" arrangement or mechanical type sensor (e.g., a weight sensor, a physical contact switch, etc.) may serve in this role. Upon an article transferring from the takeaway conveyor 14 to one of the indexing conveyors 26a-26f, the corresponding segments 28a-28f run until the sensor associated with the segment 28a closest to the storage location, or bin 30, detects the article.

In the event a second article for delivery to a second location or bin 30 reaches that same indexing conveyor 26a-26f, that article transfers in a similar fashion. The second article conveys until it reaches the segment 28b upstream of the segment 28a holding the first article, which may be held stationary. This sequence can be repeated until an article associates with each segment 28a-28f of each indexing conveyor 26a-26f.

Once one or more of the indexing conveyors 26a-26f are loaded, the articles transfer to the appropriate storage location. In the illustrated embodiment, this comprises a structure 30 including a plurality of bins 32 arranged in columns corresponding to the number of indexing conveyors 26a-26f. The number of rows may be as few as one (in which case the indexing conveyor described above could be replaced with a simple continuously running conveyor for transferring selected article(s) from the takeaway conveyor 14 to the appropriate bin). However, to maximize the throughput, the number of bins may correspond at least to the number of segments on the associated indexing conveyor, such as for example to the number of segments 28 times the number of conveyors 26. Thus, in the example where six indexing conveyors comprise six segments each, the structure 30 is six bins by six bins.

The outfeed end of each indexing conveyor 26a-26f nominally lies adjacent only one row of bins 32. If any article on the farthest downstream indexing conveyor 26a-26f belongs in one of those bins (which may be known using either on the spot detection (manual or automatic) or controls), then the corresponding indexing conveyor actuates such that the article transfers to the desired bin. The next-in-line article then advances as described above until the sensor associated with the furthest downstream segment (segment 28a in the example) detects the article. If that article belongs in the same bin as the preceding one (such as if both are going to a common destination or otherwise share a common characteristic), then it too transfers.

Once all articles slated for a bin in the nominal row transfer, the structure 30 may be moved to associate the bins of another row with the outfeed end of the indexing conveyors 26a-26f, and the sequence described above repeats. In the case where the bins 32 are spaced both horizontally and vertically from each other, this may be accomplished by using a lifter to raise and lower the structure 30 such that an article to be transferred from the furthest downstream segment 28a of each indexing conveyor 26a-26f positioned adjacent the correct bin, at which time that segment activates to effect delivery. Alternatively, the transverse conveyors 26 may move to associate with the correct bins 32.

As illustrated, the structure 30 may be mobile, such as through the provision of wheels 34. Once sortation ends for a given run or shift, the structure 30 may move to a location where the articles are further processed (such as for packaging). In the interim, a replacement structure may be associated with the station 24 such that the sortation efficiency remains unhindered because of the time required to check and unload the bins.

As noted above, each structure 30 in the arrangement shown in FIGS. 4-6 thus includes thirty-six bins. In this exemplary arrangement, three structures 30 associate with each takeaway conveyor 14, and ten takeaway conveyors exist. The total number of possible sort destinations equals 1,080. If the twelve rows of bins exist instead of six, this figure doubles and thus becomes 2,160. If six stations associate with each secondary conveyor, it doubles again to 4,320. Then doubling the number of takeaway conveyors (including by possibly adding a third level of conveyors; see below) to twenty results in 8,640 possible sort addresses, a figure unheard of using a conventional single induction loop of any reasonable size.

An alternative to a vertical arrangement is one where the structure 30 shown in FIG. 6 lies with its back 30a parallel to the ground such that the bin entrances 32a are positioned below the indexing conveyors 26a-26f. A linear motion device could then move the structure 30 to and fro as necessary to ensure that the articles transferred from the segments fall into the appropriate bin. Likewise, providing fewer rows than the number of indexing conveyors makes it necessary to move the structure 30 in two different directions to match the next-in-line article with the corresponding bin.

Instead of using the arrangement shown in FIGS. 5 and 6, yet another option involves accomplishing further sorting downstream of the matrix by separating the flow onto a plurality of "lines," such as by using a series of parallel-running conveyors and a diverter (not shown) to route the articles accordingly. The individual conveyors in these lines may then form the infeed conveyors of a second matrix system (not shown), which can further sort the articles into even smaller sub-groups. The process may repeat as necessary to create the desired degree or "level" of sortation for a particular operation.

Rather than using a matrix system 10 to deliver articles from a storage location, it may find utility in a converse arrangement. For example, upon receiving a delivery, the articles (boxes, packages, etc.) requiring sortation may transfer to an infeed conveyor at the warehouse that ultimately splits into a plurality of the infeed conveyors 12 of the matrix system 10. Sortation of the articles may follow as described above to place all those with a common parameter or characteristic on a particular takeaway conveyor 14 for delivery to a particular storage location in the warehouse (e.g., one for books on a certain topic reside, books having a title beginning with a particular letter of the alphabet reside, etc.). The takeaway conveyors 14 can then be switched to infeed conveyors 12 for delivering articles for delivery back to the matrix 10, which would then sort those articles having the common characteristic that triggers transfer to the takeaway conveyors (formerly infeed conveyors).

In accordance with still another aspect of the invention, the matrix system 10 may also include three or more levels of conveyors. For example, the third conveyors of this level may receive selected articles from the second takeaway conveyors for delivery to different destinations. Alternatively, these third conveyors may serve as second infeed conveyors for delivering articles to takeaway conveyors 14 also common to the first infeed conveyors 12, or instead may receive articles from the infeed conveyors and function as takeaway conveyors.

In the latter case, the third conveyors may extend parallel to the second takeaway conveyors 14 and may lie either above or below the infeed conveyors 12 (with corresponding means, such as chutes or powered elevators, used to transfer the articles depending on the orientation used). However, the third conveyors may run in a direction opposite that of the takeaway conveyors 14 and are associated with downstream sub-sortation stations (either individual people for placing the objects in bins, automated sorters for doing so, etc.). This is shown in FIG. 7 by opposing arrows B and C along the takeaway conveyors 14 and the third conveyors 34, respectively (with arrows A and D also showing that the infeed conveyors 12 may also run in different directions). The means for transferring articles may include a transfer conveyor 16 similar to the one described above, but capable of elevating the articles in a reliable fashion (such as by using a high-friction surface, scoops, cleats, a "wedge" conveyor, or similar types of arrangements that are well known in the art for reliably conveying articles against gravity). As perhaps best understood with reference to FIG. 8, it is also preferable for the transfer conveyor 16 to terminate in a plane above the corresponding third conveyor 34, such that transferred articles simply drop onto the conveying surface.

As should be appreciated, a matrix system 10 with two or more sets of takeaway conveyors may provide several advantages in use. For example, in the case of two levels of takeaway conveyors 14, 34, the ability to transfer articles from the infeed conveyor 12 to either a second or third takeaway conveyor 14 or 34 during a single run can significantly increase the potential throughput of the system 10. This increase results without a corresponding increase in the conveying speed, which helps to make the overall operation more relaxed and effective than most conventional approaches.

Another possibility involves alternating between the two levels of takeaway conveyors 14, 34 in the matrix sorter system 10. For example, the lower takeaway conveyors 14 used in conjunction with the infeed conveyors 12 may sort a first batch or group of articles introduced to the system 10. After the articles comprising the first batch move from the infeed conveyors 12, a second group of articles (of the same or a different type) may be introduced to the system 10 and transferred to the upper takeaway conveyors 34 while the first group are simultaneously being conveyed and sorted downstream on the lower takeaway conveyors 14. Using such an arrangement may allow for continuous operation of the system 10, despite the possible need for periodic downtime with one level of takeaway conveyors 14 or 34 after sorting a batch of articles (such as to address mis-sorted articles or situations where one or more articles are incorrectly introduced into the system and need to be replaced to fill a particular order).

Still another possible use of a matrix system involves operating only a portion of the infeed conveyors 12 at a given time. For example, in the arrangement shown in FIG. 4, only one of four groups $G_1$, $G_2$, $G_3$, $G_4$ of five infeed conveyors 12 may deliver articles to the takeaway conveyors 14 (or deliver articles from only a certain storage location in a warehouse) during a first shift, with other groups used during different shifts. This maintains constant wear on the conveyors of the various groups and also extends their service life. At times when an increased number of articles require sortation (i.e., at Christmas), then all corresponding infeed conveyors 12 present may run simultaneously.

An alternative means for transferring articles between the conveyors 12, 14 may comprise a separately actuatable portion 36 of the associated infeed conveyor 12 (see FIGS. 9 and 10, as well as U.S. Pat. No. 4,426,074, the disclosure of which is incorporated herein by reference). Obviously, these drop down portions 36 would be placed at or near the intersections with the takeaway conveyors 14, which as should be appreciated represent possible or potential transfer points.

In the case of movable portions 36, offsetting or "staggering" the transfer points along the lateral extent of the takeaway conveyors 14a-14d comprising the system 10 prevents collisions among articles transferred from upstream infeed conveyors (such as infeed conveyors 12a-12c in the case of four). FIG. 9 illustrates this approach by making each second or takeaway conveyor 14 wider than the associated first or infeed conveyor 12 (note phantom portion), and/or by selectively positioning the end of the drop down portion 36. This allows for the easy and efficient placement of articles at different locations along the width of the takeaway conveyor 14, while preventing collisions with articles delivered from an upstream transfer point associated with a different infeed conveyor 12. In other words, the initial location of each article upon transfer may be staggered along the lateral dimension of the associated takeaway conveyor 14. This is illustrated by showing packages or parcels $P_1$ and $P_2$ in a side-by-side configuration in FIG. 10 (which shows the actual transfer of the second package or parcel $P_2$ to the takeaway conveyor 14 via the delivery end of a "staggered" drop down portion 36).

In accordance with a further aspect, the means for transferring at least one article to an intersecting one of the second conveyors may comprise a transfer conveyor in the form of a transpositor conveyor 38, which may form part of one or more of the first or infeed conveyors 12. Referring to FIGS. 11-12, the transpositor conveyor 38 may include a retractable section 40 that overlies the takeaway conveyor 14 at each junction or intersection (see, e.g., FIG. 18). FIG. 11 illustrates an oversized gap between the moving end of the section 40 and the corresponding end of the upstream section of conveyor 12, which would normally be substantially closed when the extended transpositor conveyor 38 forms a substantially continuous conveying surface.

Thus, if product is to pass through the infeed conveyor 12 and continue along the conveying path it forms, the retractable section 40 of the transpositor conveyor 38 remains in the normal or extended condition to create a substantially continuous path. However, if it is desired to deliver a approaching product to the adjacent takeaway conveyor 14 (which condition of the product may be sensed using a sensor, such as a photodetector), the section 40 of the transpositor conveyor 38 may be retracted in the conveying direction to expose a second conveying surface, such as of the takeaway conveyor 14 or a transfer conveyor 16, and deliver the product thereto. In this manner, the transpositor conveyor 38 may run continuously, so that upstream product continues to move, while the desired product is reliably delivered for further conveyance by the takeaway conveyor 14.

With reference to FIGS. 13-17, an example of a transpositor conveyor 38 in accordance with one preferred embodiment is shown. Specifically, the retractable section 40 comprises a moving support bed including a pair of side rails 42. These rails 42 are slidably received in corresponding guides 44 associated with a housing 46 adapted for telescopically receiving the retractable section 40 in the retracted condition. The guides 44 may be separate structures spaced along depending side frame members 46a, 46b of the housing, which are interconnected by a bed 46c forming a support surface for the articles or products being conveyed. However, the use of a continuous guide is possible.

To move the section 40 to and fro relative to the housing 46, one or more pinions 48 is associated with a rotatable drive shaft 50, which may be supported by the side frame members 46a, 46b of housing 46. The pinions 48 interface with elongated racks 52 carried by the retractable section 40. A corresponding motive device, such as a servomotor 54, serves to rotate the drive shaft 50 to advance or retract the section 40 to a nested condition within the housing 46.

An endless belt 56 is provided for conveying articles along the transpositor conveyor 38. As perhaps best shown in FIG. 15, the belt 56 extends over front and rear guide structures of the conveyor 38 to create an endless path of travel. These guide structures may comprise fixed nose bars 58, 60 positioned at the end of section 40 and housing 46, respectively, but idler rollers or the like could also be used.

Opposite the conveying path, the belt 56 extends over a first idler 62 that is connected to and moves along with the section 40, and thus maintains a fixed relationship with the forward nose bar 58. The belt 56 then extends over a first idler 64 supported by the side frame members 46a, 46b, and then over a drive shaft 66 for driving the belt 56. The drive shaft 66 may include belt-engaging elements, such as sprockets, and is rotatably associated with a second motive device, such as a servomotor 68, operating independent of the first motive device for retracting and extending the section 40 of the transpositor conveyor 38. Pinch rollers 70, 72 are also provided for helping to retain the belt 56 in engagement with the driving elements on the drive shaft 66. Alternatively, an internally powered or motorized drive roller may be used to engage the belt 56 (such as by sprockets) and serve as the second motive device, which avoids the need for an external servomotor. Various examples of such rollers are known in the art (see, e.g., U.S. Patent Application Publication No. 2005/0119098, the disclosure of which is incorporated herein by reference, and the discussion that follows).

Figure 16:
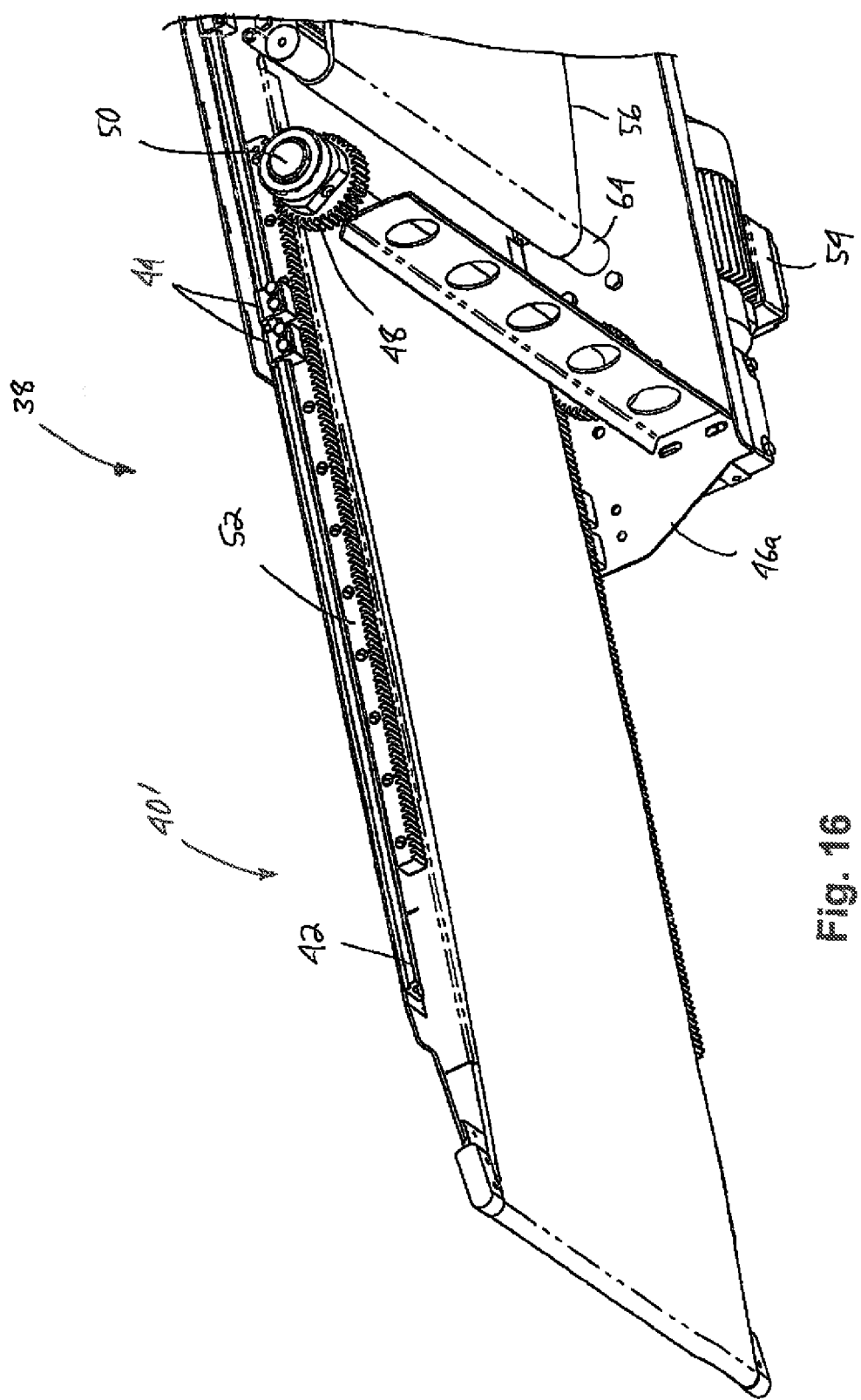
Figure 17:
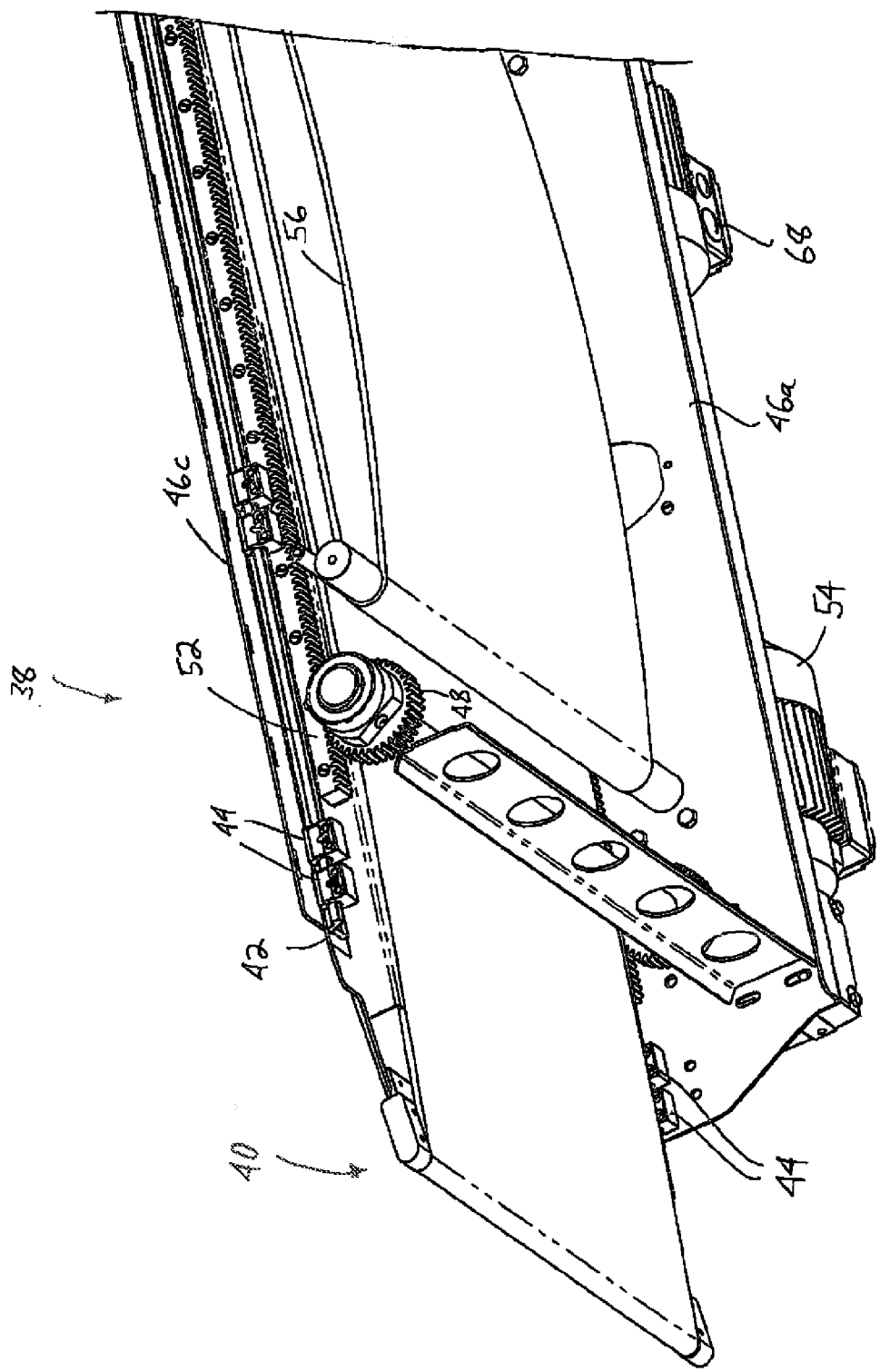

Referring now to FIG. 16, the retractable section 40 in the normally extended condition is shown. In this position, the pinions 48 are adjacent the rearward portion of the racks 52. When used in system 10, the belt 56 may be driven to move the articles along the conveyor 12 in the conveying direction and along the substantially continuous path formed.

When it is desired to transfer the articles from the infeed conveyor 12 associated with the transpositor conveyor 38, such as to a transfer conveyor 16 for delivering the articles to a takeaway conveyor 14, the section 40 is retracted by activating the motor 54 to rotate the pinions 48 in the corresponding direction. This retraction is completed so as to more fully expose a gap G between the transpositor conveyor 38 and the upstream end of conveyor 12, such that the articles being conveyed may pass. This movement, combined with the combined effects of the forward movement of the belt 56, the inertia of the articles, and gravity, serves to deposit the articles on a surface 16a of the transfer conveyor 16 (which as shown may comprise a closely spaced, generally flat belt conveyor combined with a roller chute type of conveyor that may lead to a takeaway conveyor 14, but any other arrangement capable of conveying away the articles could be used).

Figure 18:
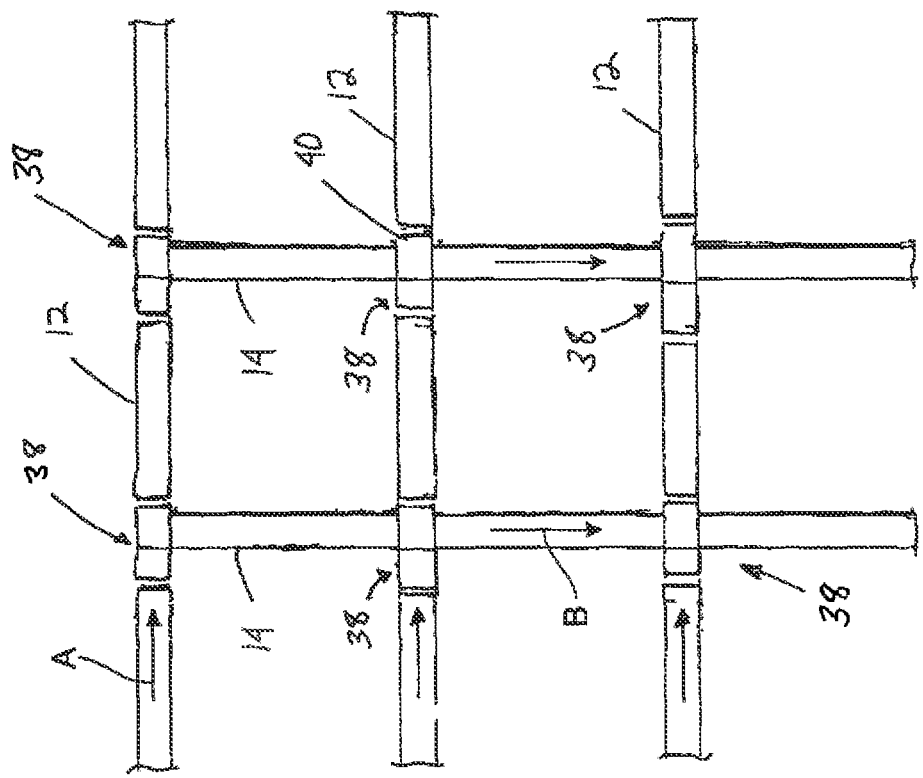

However, as shown in FIG. 18, it is possible to provide the transfer function by simply positioning the transpositor conveyor 38 associated with the infeed conveyor 12 at each intersection with a takeaway conveyor 14. In other words, the retractable section 40 is positioned directly above and overlying the conveying surface of the takeaway conveyor 14, such that the articles are deposited directly thereon for conveyance in a second direction and thus effecting efficient sortation.

As should be appreciated, the relationship of the idlers 62, 64 is such that the section 40 retracts while maintaining the length of the belt 56 below the section 40 at a fixed distance relative to the leading edge (i.e., nose bar 58). Despite this retraction of the section 40, movement of the belt 56 in the conveying direction may continue as a result of the driving force provided by the second motive device 68.

Once the articles have cleared, as may be estimated based on time or by a suitable sensor, the section 40 may be extended to further the downstream conveyance of any upstream articles along the associated conveyor 12. When further sortation is desired by delivering articles to the takeaway conveyor 14, the section 40 may then again be retracted. As should be appreciated, this operation may be repeated as necessary to effect sortation of the articles in the desired manner.

The transpositor conveyor 38 may be designed to have a low profile, and for this purpose may incorporate Applicant's MICROSPAN conveyor chain technology, as described in U.S. Pat. No. 7,314,132, the disclosure of which is incorporated herein by reference.

Figure 19:
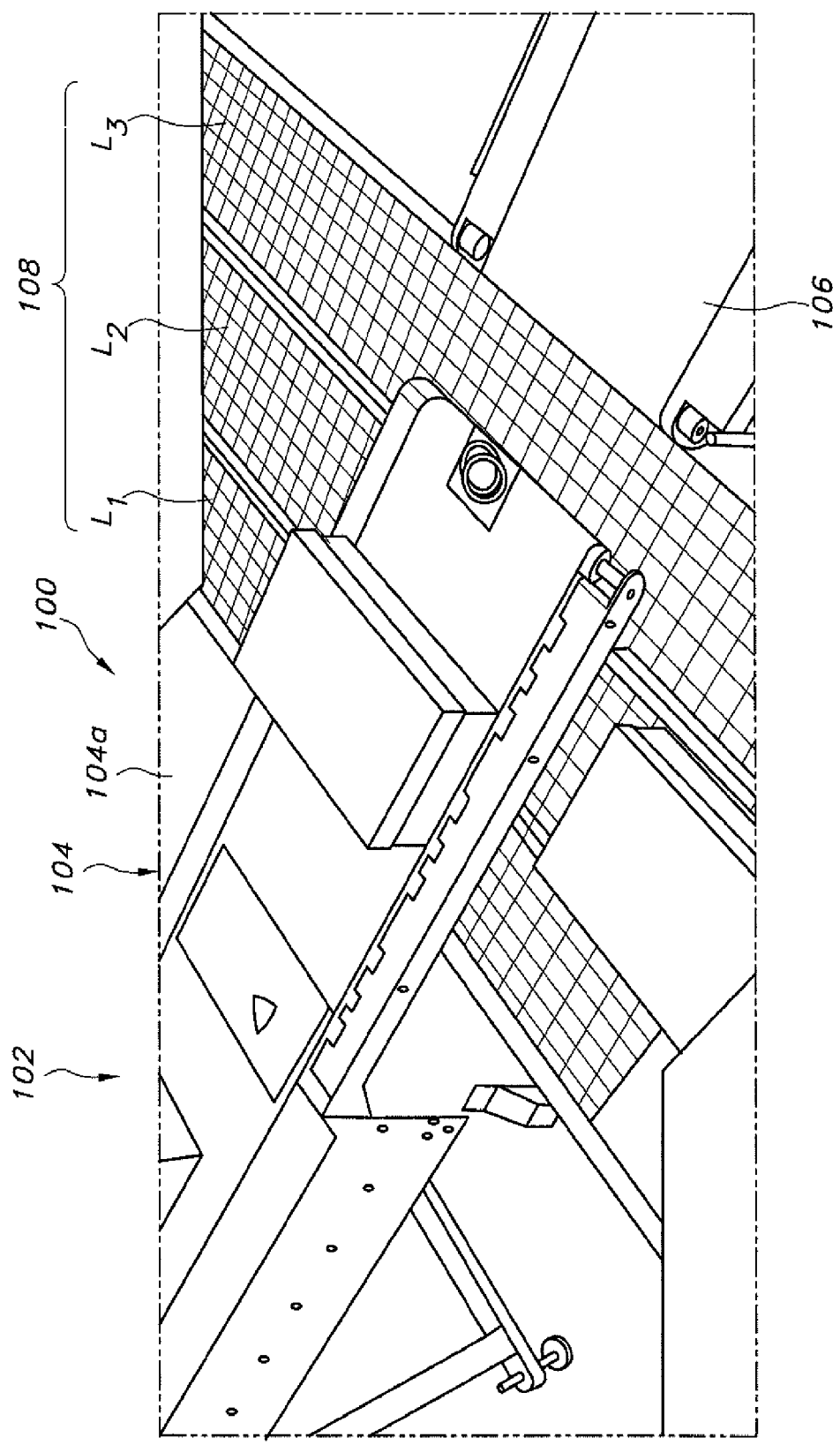
FIGS. 19-46 illustrate additional embodiments of sortation systems and related features.

A further embodiment of a sortation system 100 is shown and described with reference to FIG. 19. In this embodiment, the system 100 comprises a first conveyor including an infeed conveyor 102 having a transpositor 104 for transferring articles to another location corresponding to the relative position of the conveyor (e.g., extended or retracted). In the illustrated embodiment, the transpositor 104 bridges to an outfeed conveyor 106, which may also be part of the first conveyor in a sortation system. The transpositor 104 overlies a second conveyor 108, which extends in a transverse direction and comprises a plurality of distinct lanes L, which may be achieved by separate chains or belts, or dividers 110, as shown. In the illustrated embodiment, three lanes $L_1$, $L_2$, and $L_3$ are shown, but any number greater than one may be used. The takeaway conveyor 108 is also shown as fully intersecting the path of travel of articles on the first and second conveyors 102, 106, but it could end at the drop location, and may also be driven in either direction to convey the articles to a desired downstream location.

Thus, when the retractable section 104a of the transpositor 104 is withdrawn, any article(s) are deposited on the underlying conveying surface of the takeaway conveyor 108, primarily as the result of gravitational forces. As should be appreciated, by controlling the amount of retraction (such as by controlling the servomotor 68 or like motive device by way of a controller) among a plurality of retracted positions, the articles may be caused to drop into one of the several lanes on the takeaway conveyor 108 to thus achieve a measure of sortation. For instance, retraction the full amount when the article is on the proximal end of the retractable section 104a would deposit the article on the first lane; retraction at an intermediate position would deposit the article on the second lane; and retraction when the article is near the end of the section 104a would correspond to the third lane (of course, no retraction would allow the article(s) to continue on to the outfeed conveyor 106, and possibly to a downstream transpositor intersecting with a different takeaway conveyor, not shown). The relatively simple arrangement thus provides at least four sorting outcomes using only two conveyors.

Retraction may be controlled in a known manner by identifying the article (by size, shape, or other characteristic (such as a particular destination)) and determining the position on the takeaway conveyor 108 that corresponds to a desired sortation outcome. It may also be possible to use control measures to deposit multiple articles from transpositor 104 onto different lanes of the takeaway conveyor 108 during a single retraction in a nearly simultaneous fashion. The takeaway conveyor 108 may also be provided as multiple conveyor units, one or more of which may travel in different (e.g., opposite) directions.

Figure 20:
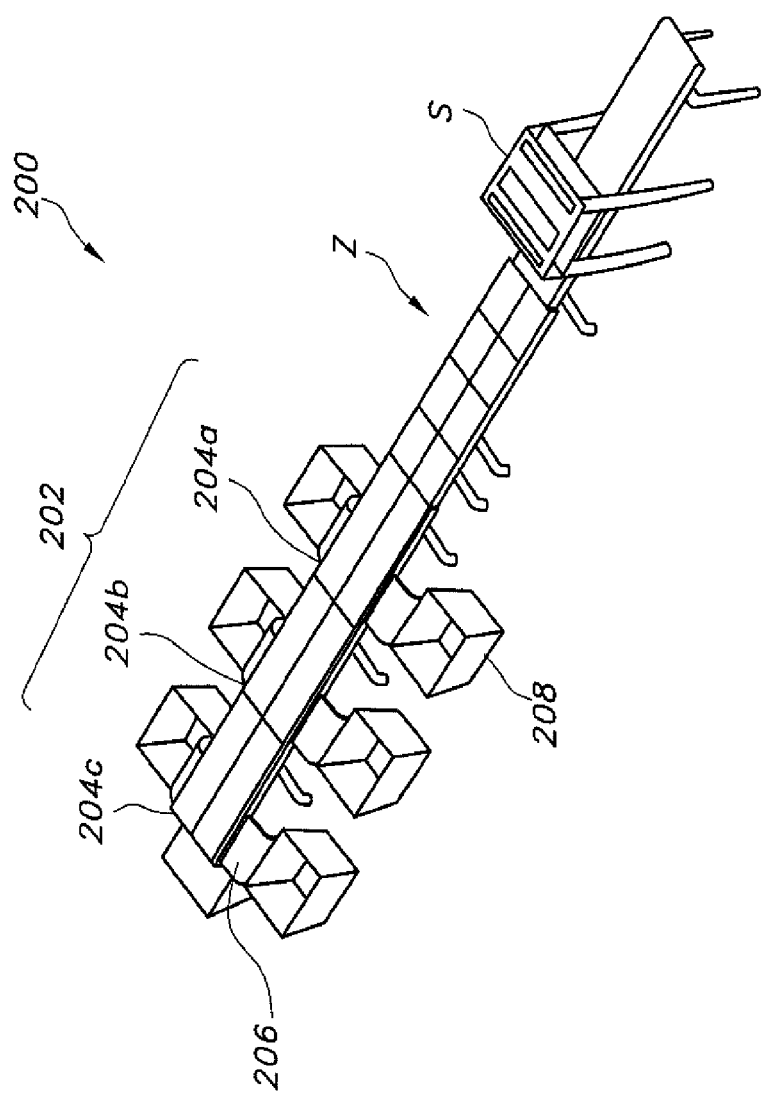
Figure 21:
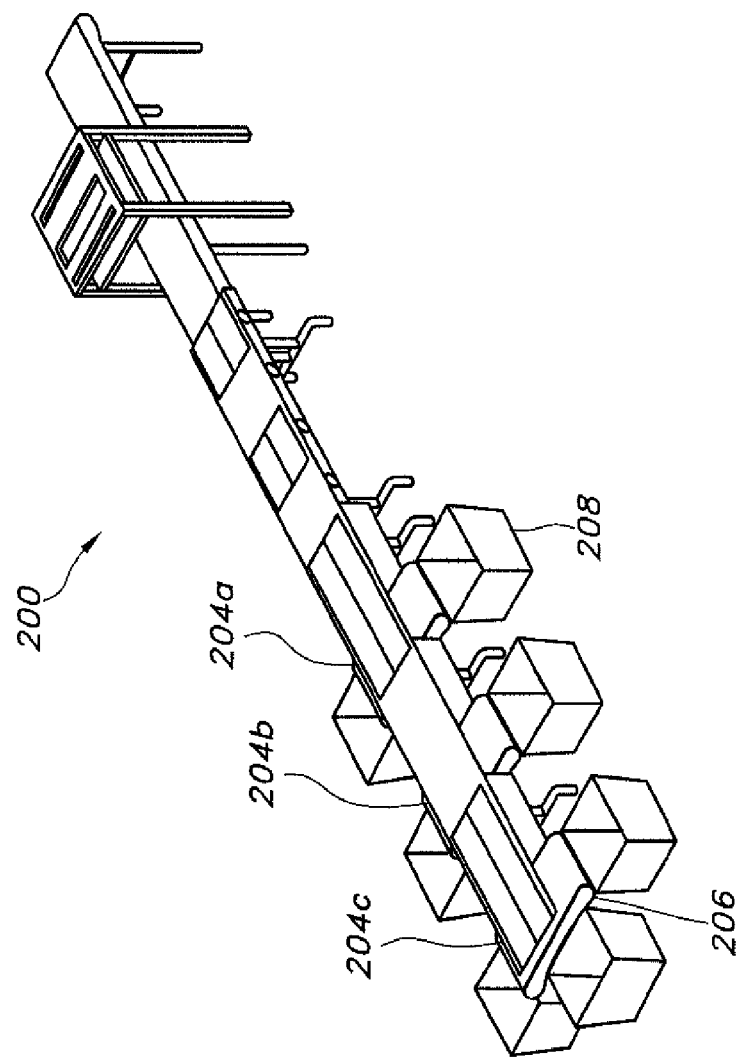
Figure 22:
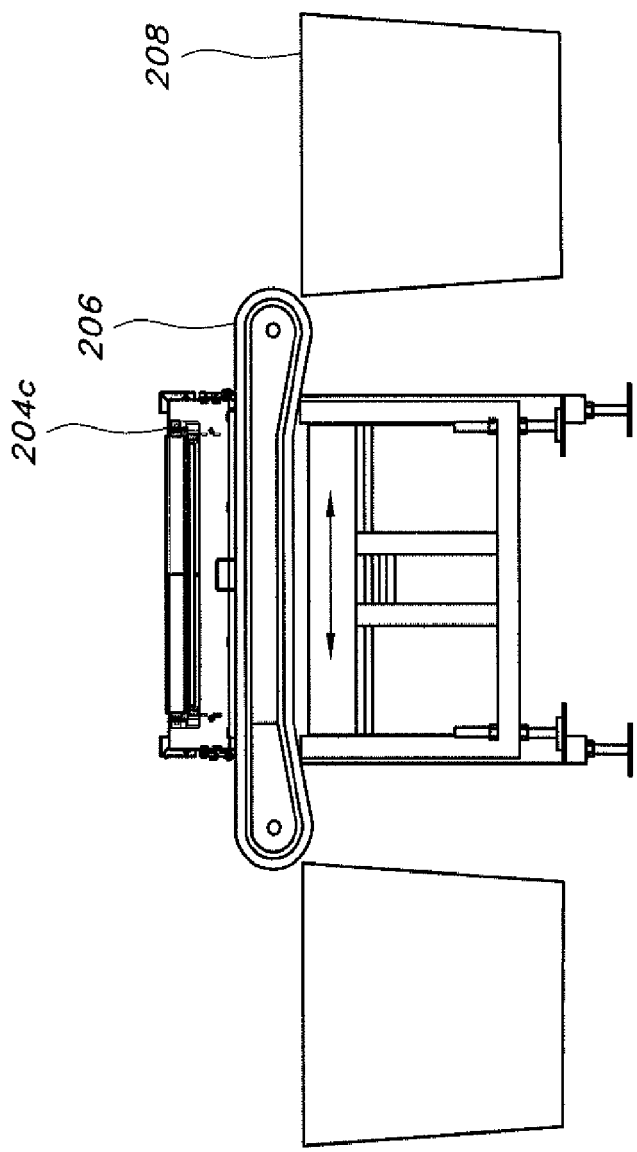
Figure 23:
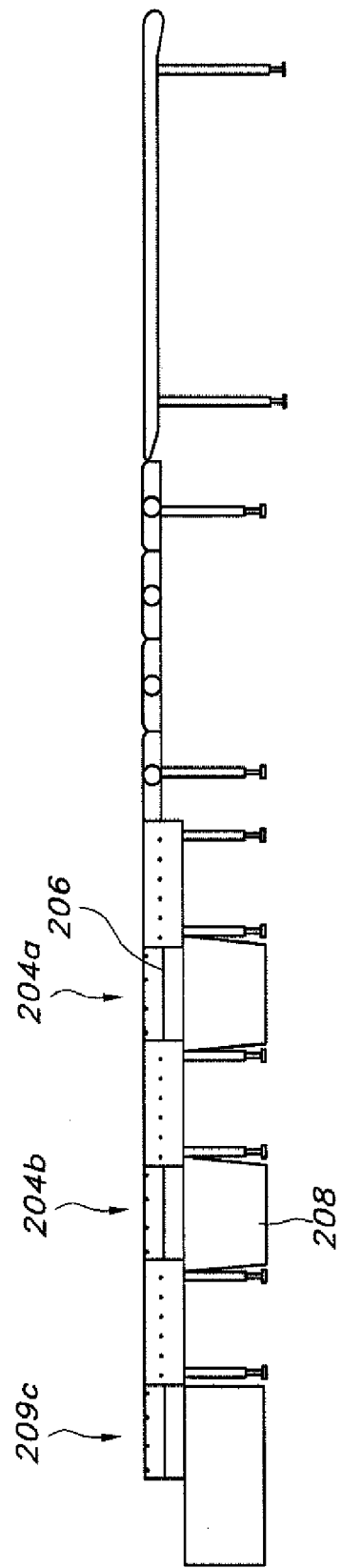
Figure 24:
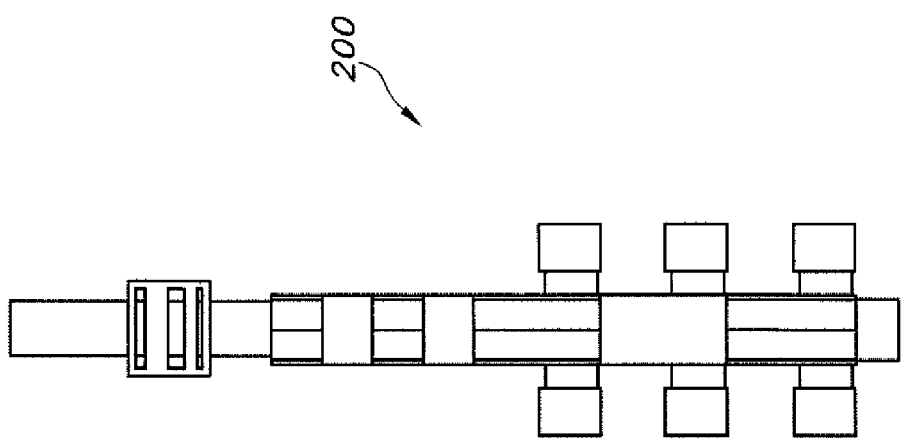

FIGS. 20-24 illustrate a further embodiment of a sortation system 200 incorporating a conveyor comprising one or more transpositors. In FIG. 20, a first conveyor 202 extending in a first linear direction includes one or more transpositors, such as for example three aligned transpositors 204a, 204b, 204c. Positioned below each transpositor 204a, 204b, 204c is a conveyor adapted for conveying a deposited article in a first, transverse direction, or a second transverse direction, in order to provide at least three possible article destinations at each transpositor location (and possibly seven, if the embodiment of FIG. 19 were used—one straight through and three to each side, each of which may be associated with a temporary storage location (e.g., bin 208)).

Figure 25:
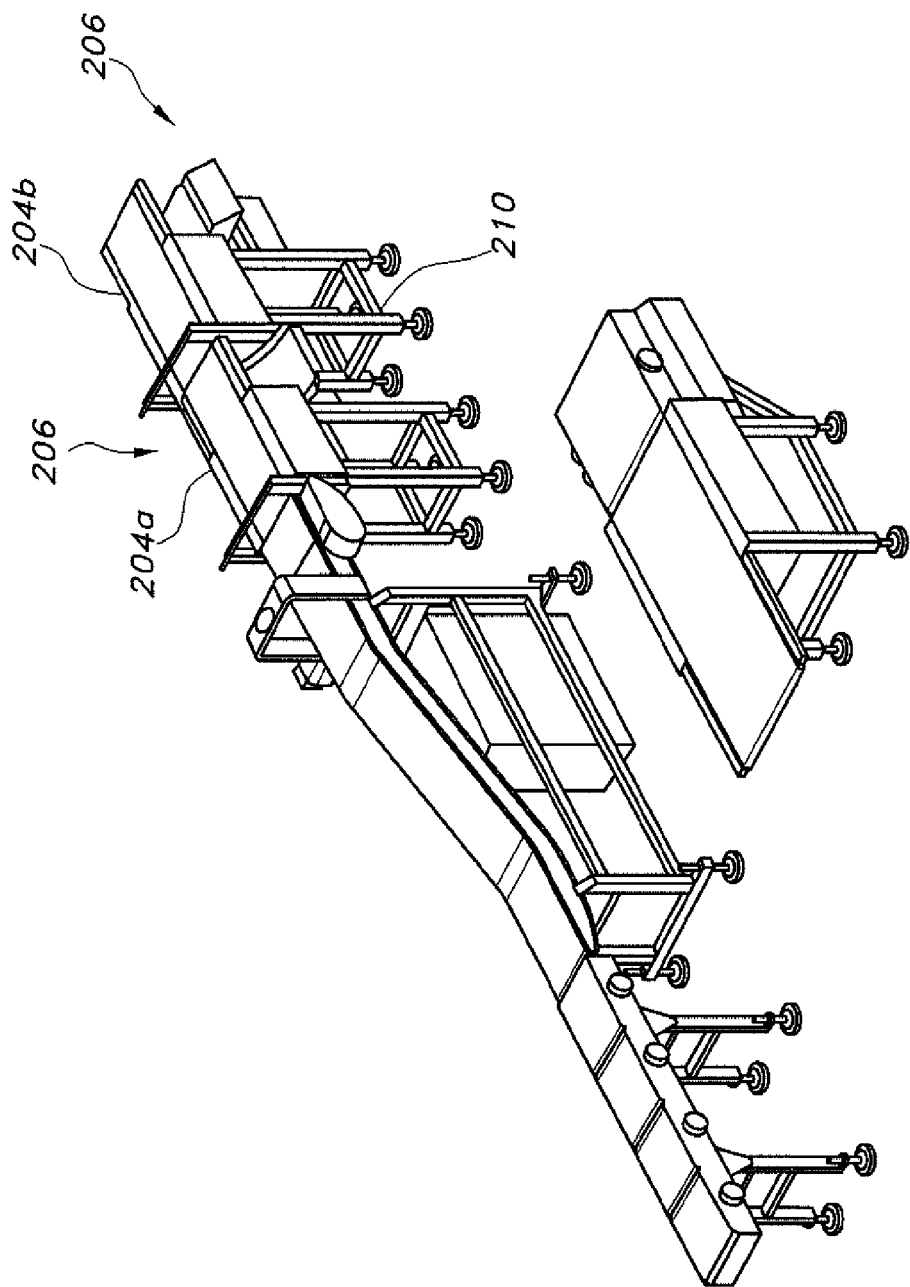

The selective bi-directional conveyance on transfer of the article from the transpositor 204a, 204b, 204c may be achieved by using a conveyor 206 having a conveying surface that may be actuated for movement of the article in either direction. For example, in FIGS. 20-24, the conveyor 206 is shown as one including a belt or chain that may be driven along an endless path in either direction (clockwise or counterclockwise) to effect the desired movement of the article, such as to a sortation location (e.g. bin 208). The belt or chain of the conveyor 206 may be driven in any conventional manner (such as a motor-driven sprocket or frictional roller connected to a motor, which may simply be reversed as necessary to provide the desired article conveyance). Two conveyors 206 could be positioned side-by-side, each traveling in different directions, and the article deposited on either depending on the desired destination. However, as shown in FIG. 25, the conveyor 206 could alternatively take the form of a pivoting tilt tray 210 having a conveying surface adapted for tilting to effect article conveyance (such as by sliding) in the desired direction.

Figure 26:
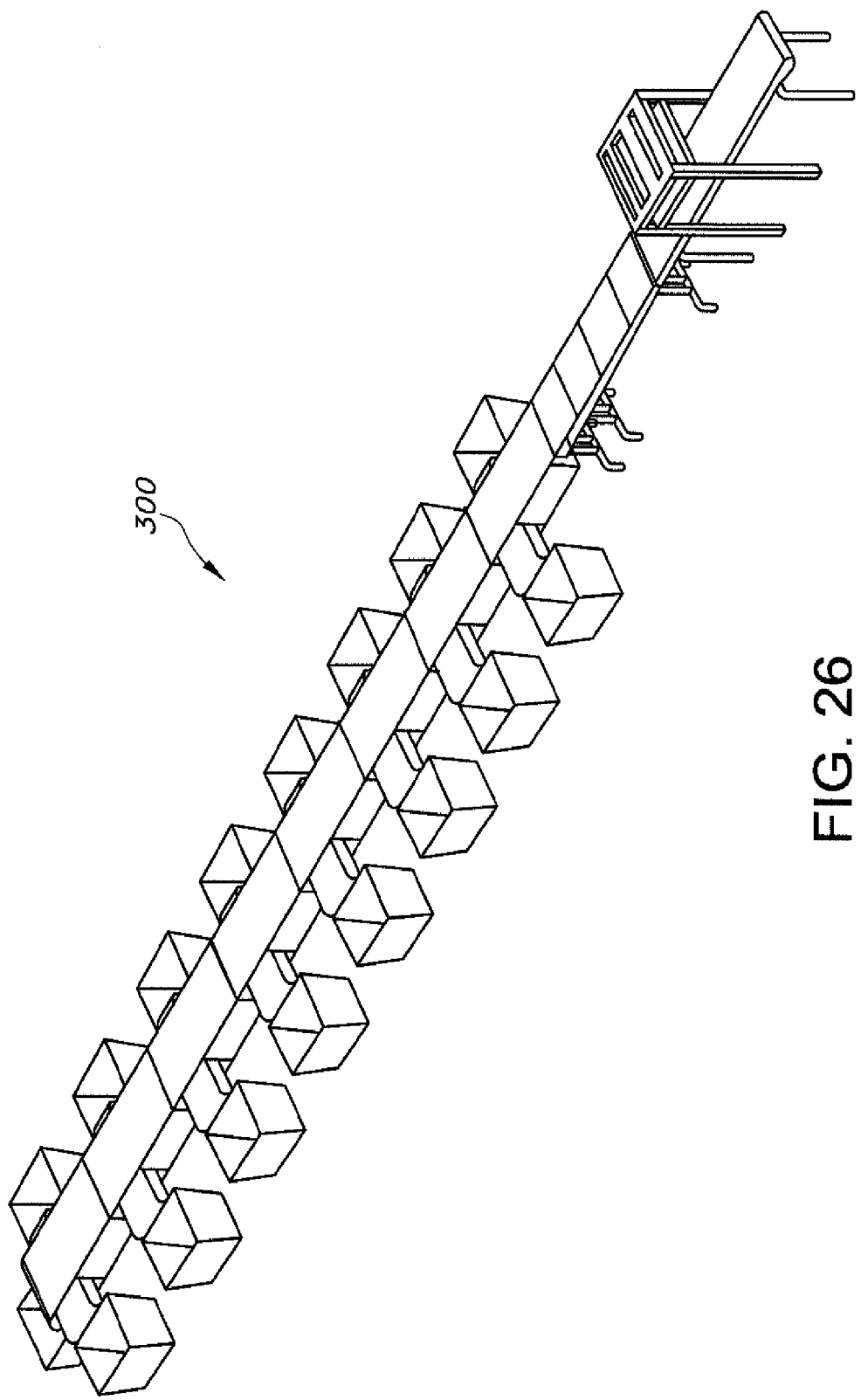
Figure 27:
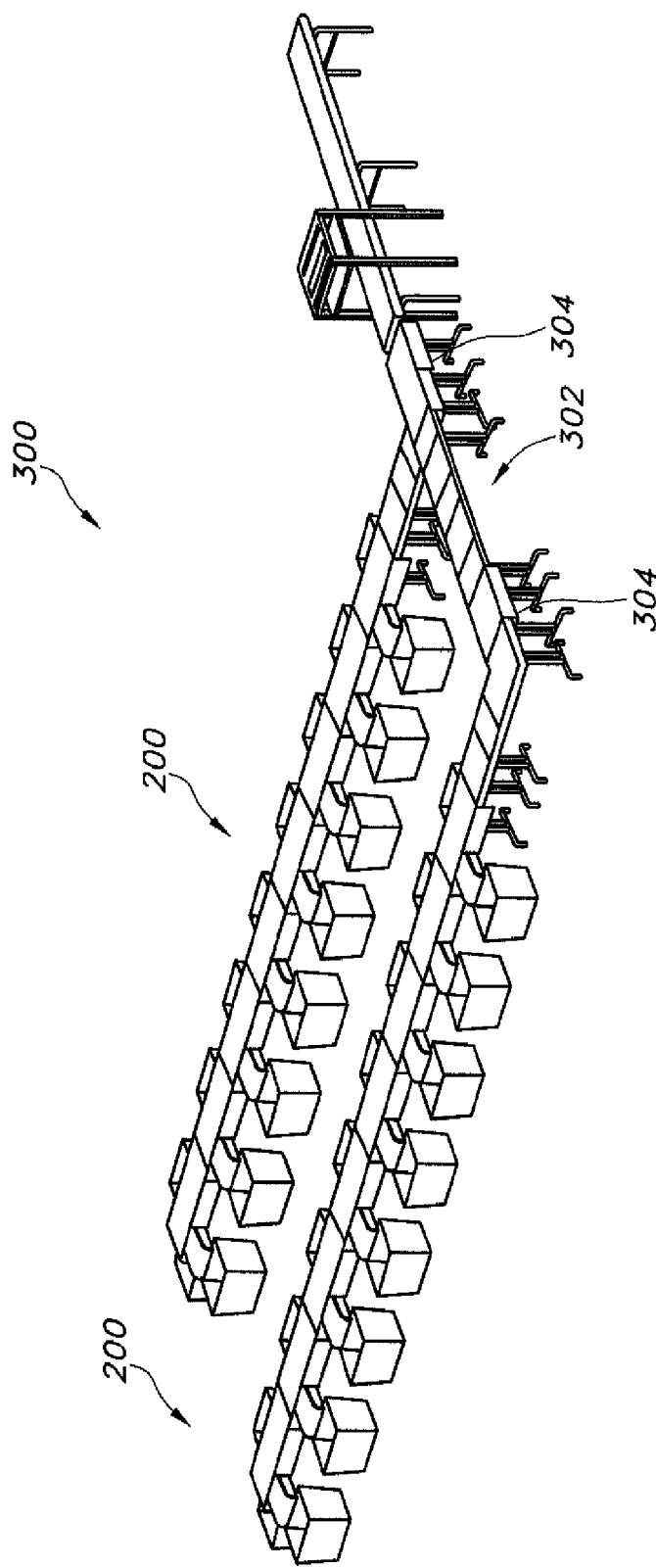
Figure 28:
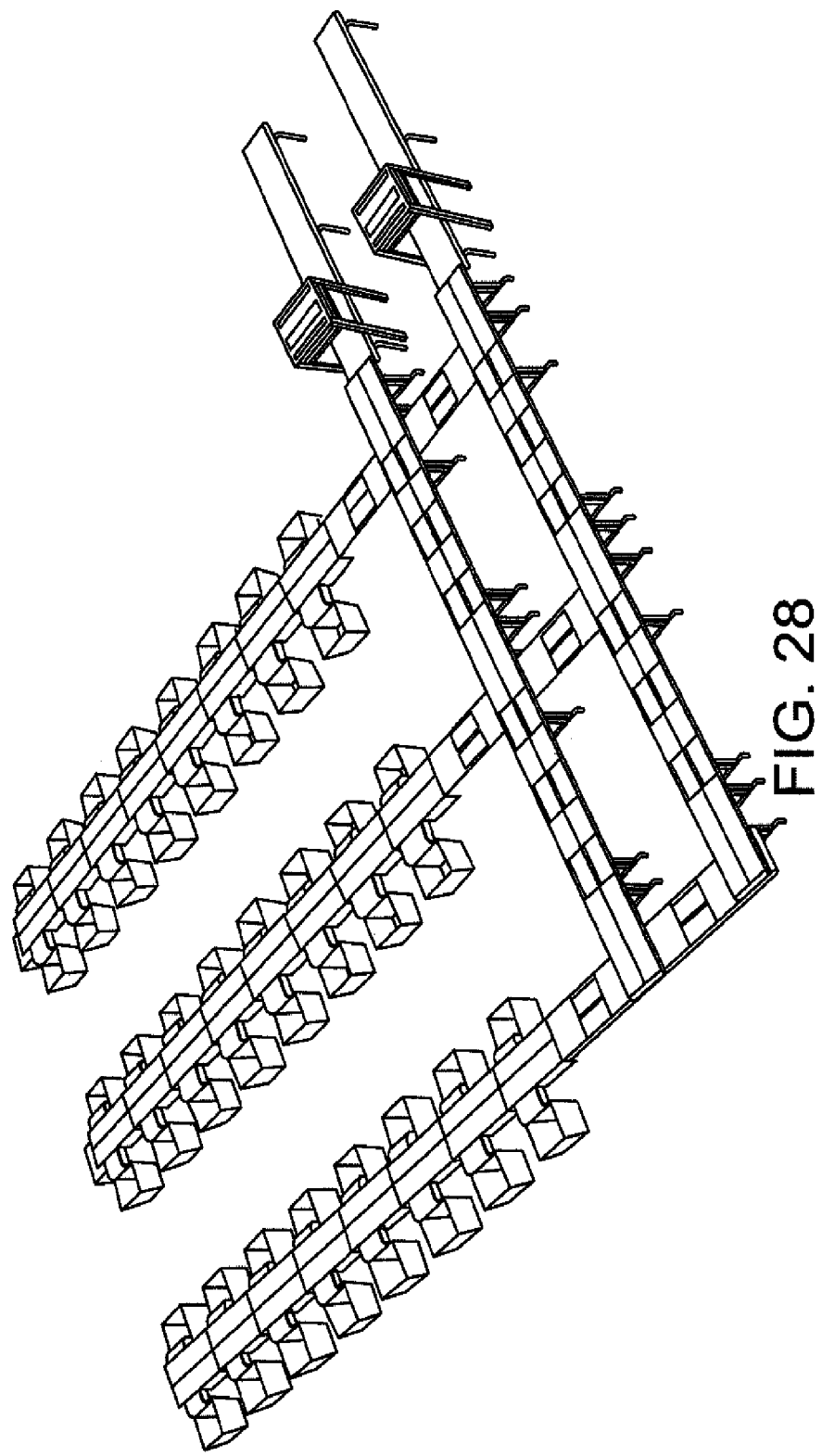

FIGS. 26-28 illustrate that the system 200 may be readily adapted for expansive sorting. For example, FIG. 26 illustrates that, for a relatively small footprint, seventeen distinct sort locations may be provided. Likewise, a further system 300 with even greater capacity may be provided by coupling two of these systems 200 together with a common infeed conveyor 302, which itself may include transpositors (FIG.

27). This would provide thirty-four distinct sort locations with only three linear conveyors, and could be expanded infinitely by adding additional transpositors (for example, by providing a bidirectional conveyor below transpositors 304 for alternately conveying to two different sortation systems 200). FIG. 28 illustrates two distinct infeed conveyors common to three conveyors including transpositors, each with 17 sort locations, for a total of 51 locations for two different streams of articles. In each case, the article feed may be provided by a zoned conveyor Z having a plurality of different zones for staging the article feed. A sensor S or like mechanism may also be provided for identifying a characteristic of the article in order to determine the sort location.

Figure 29:
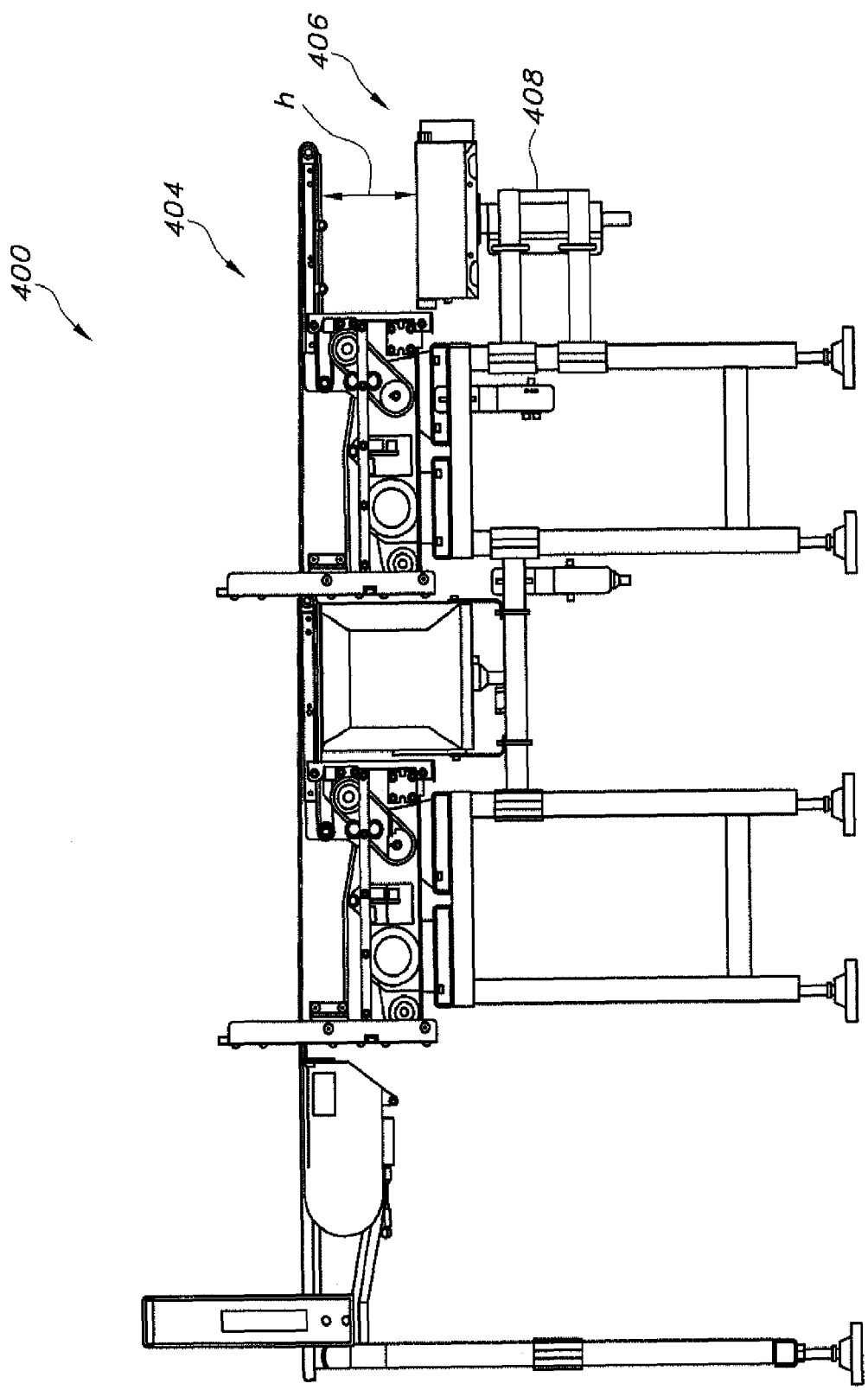
Figure 30:
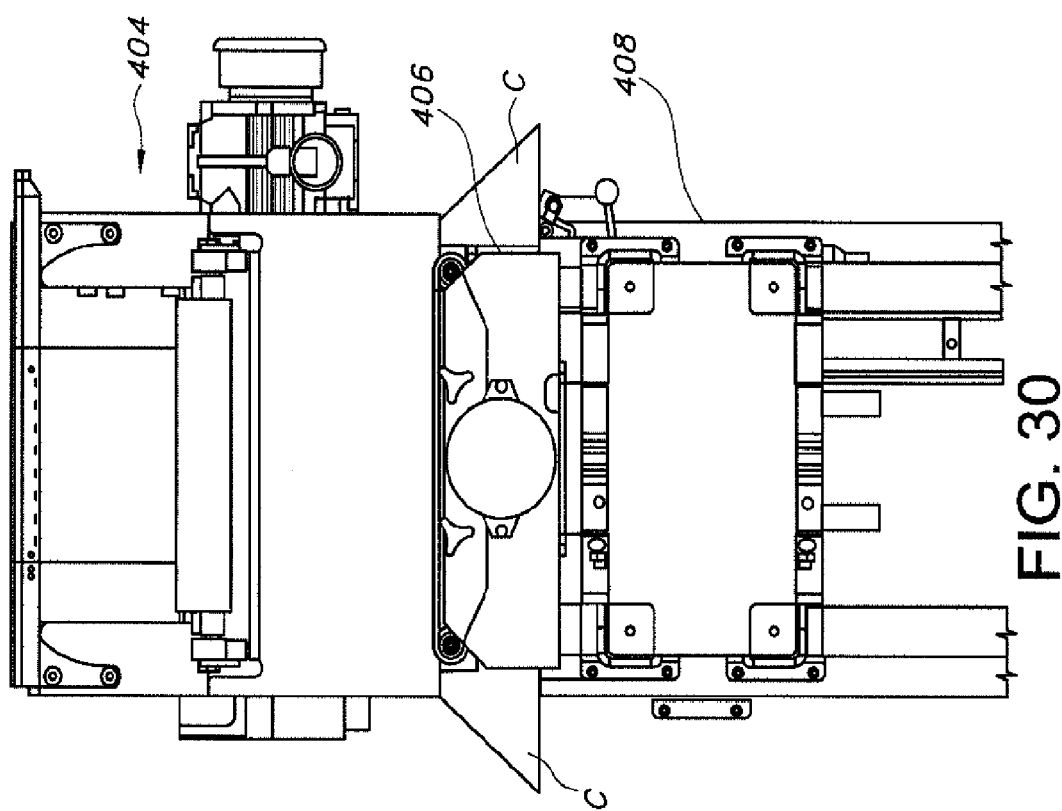

FIGS. 29-30 show a further embodiment of a system 400 for sortation including a first conveyor 402 comprising a transpositor 404, and a second conveyor 406 for receiving and conveying away one or more articles from the transpositor 404. The second conveyor 406, which may be a belt conveyor for conveying in a single direction, or bidirectionally (e.g., an endless belt conveyor or a tilt tray), is adapted for being raised and lowered relative to the transpositor 404. This may be achieved using a motive device, such as a linear actuator 408, which may be controlled by a controller, or manually if desired.

This relative movement may advantageously be used to allow the takeaway conveyor 406 to be raised or lowered to accommodate a particular height of the article. For example, for a shoe box or relatively tall article, the height could be lowered prior to the drop from transpositor 404 (h, FIG. 29), but for a small article, such as a pack of gum, the height could be raised. In addition, the relative height could be adjusted by a controller associated with the motive device, such as actuator 408, in real time based on a known characteristic of the article (such as the height as measured by one or more sensors, such as photodetectors, or as determined by scanning a bar code or the like). Aside from helping to prevent article damage as a result of the fall onto conveyor 406, this raising and lowering also helps to clear the article for purposes of the retraction and following extension of the transpositor 404 in a rapid fashion, as may be desirable for maximum throughput. These figures also show how a stationary, angled slide, such as a chute C, may be coupled to one or both ends of the conveyor 406 for delivering articles to the sortation location (e.g., bin 208).

Figure 31:
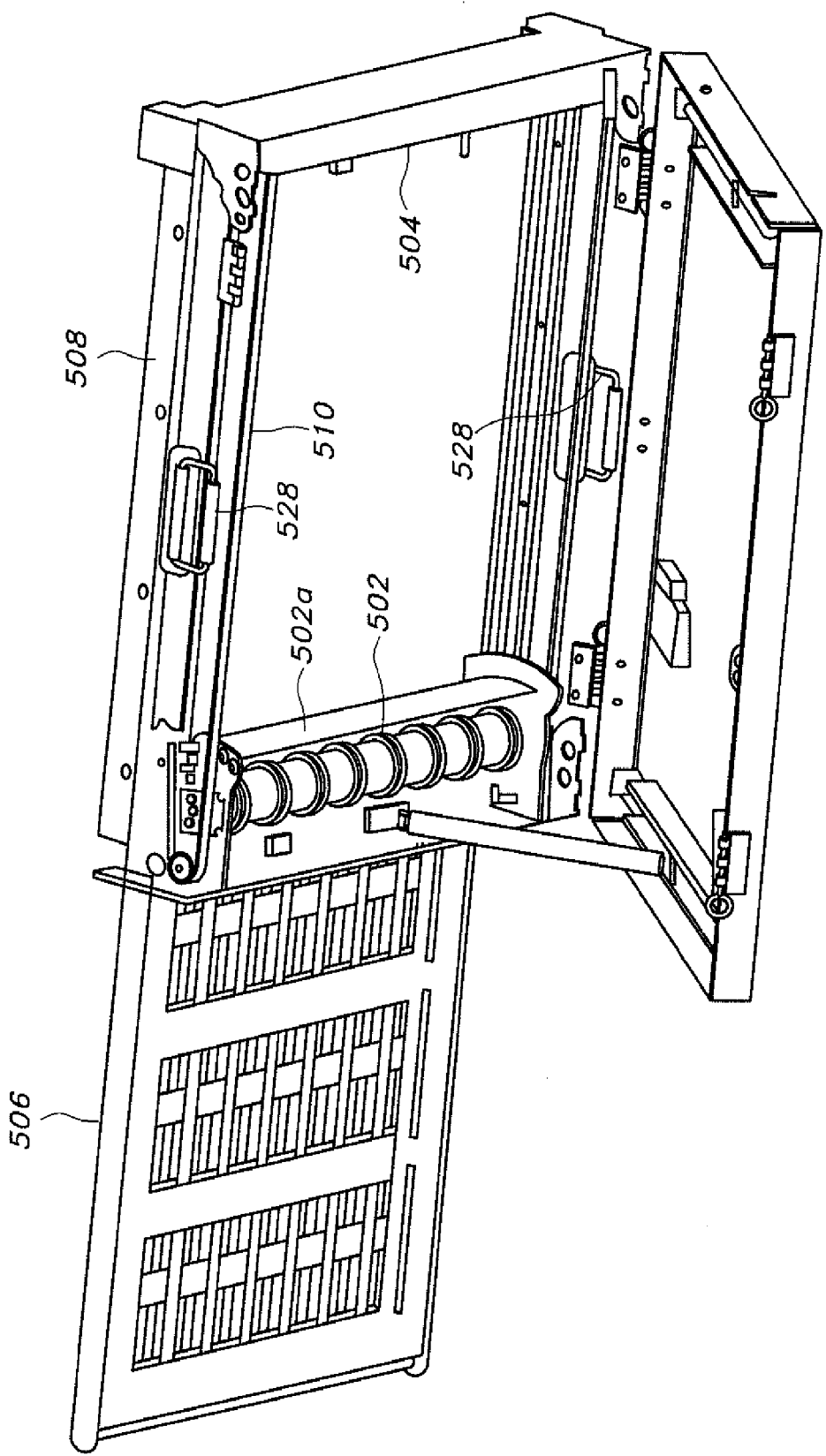
Figure 32:
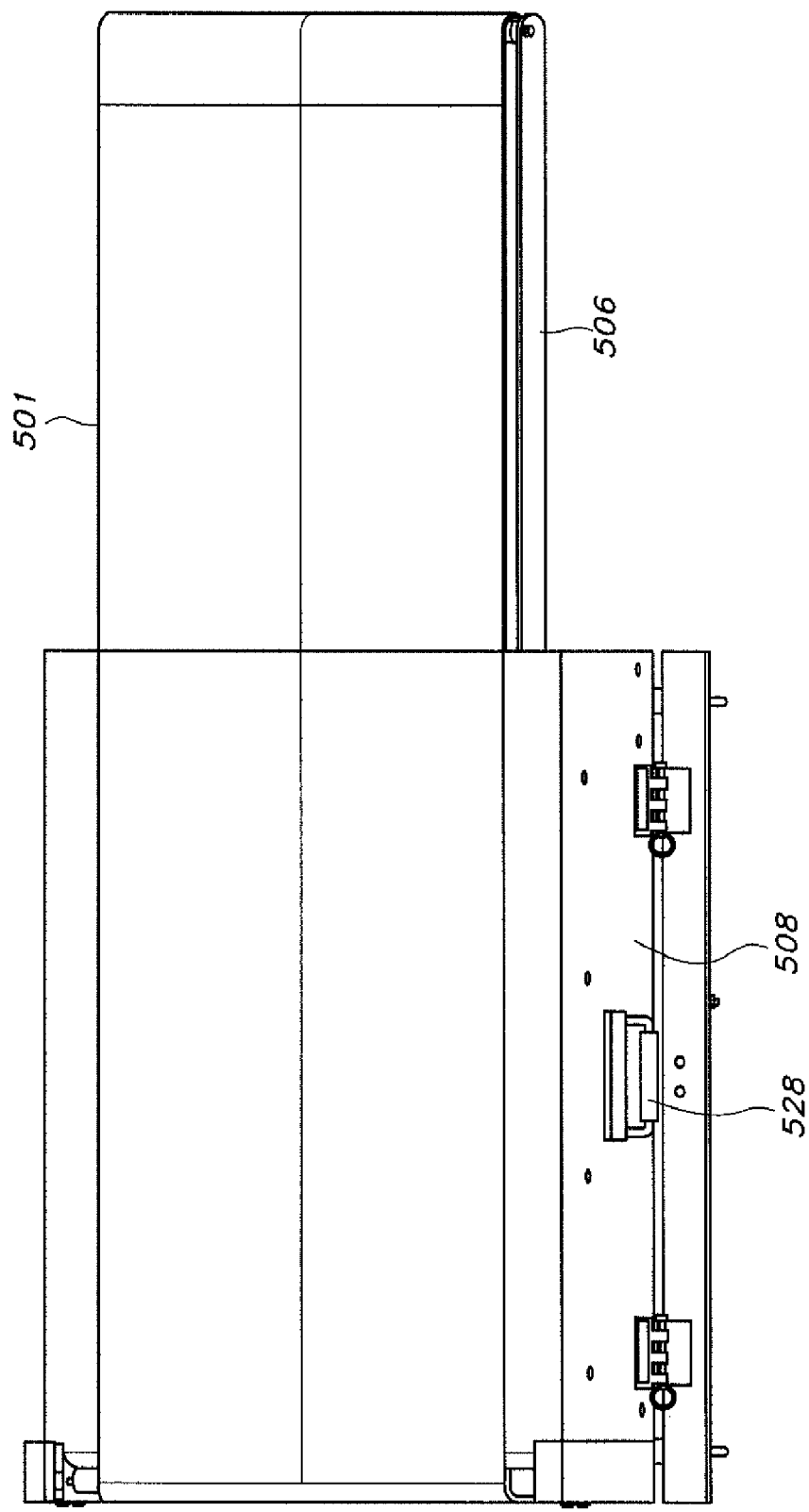
Figure 33:
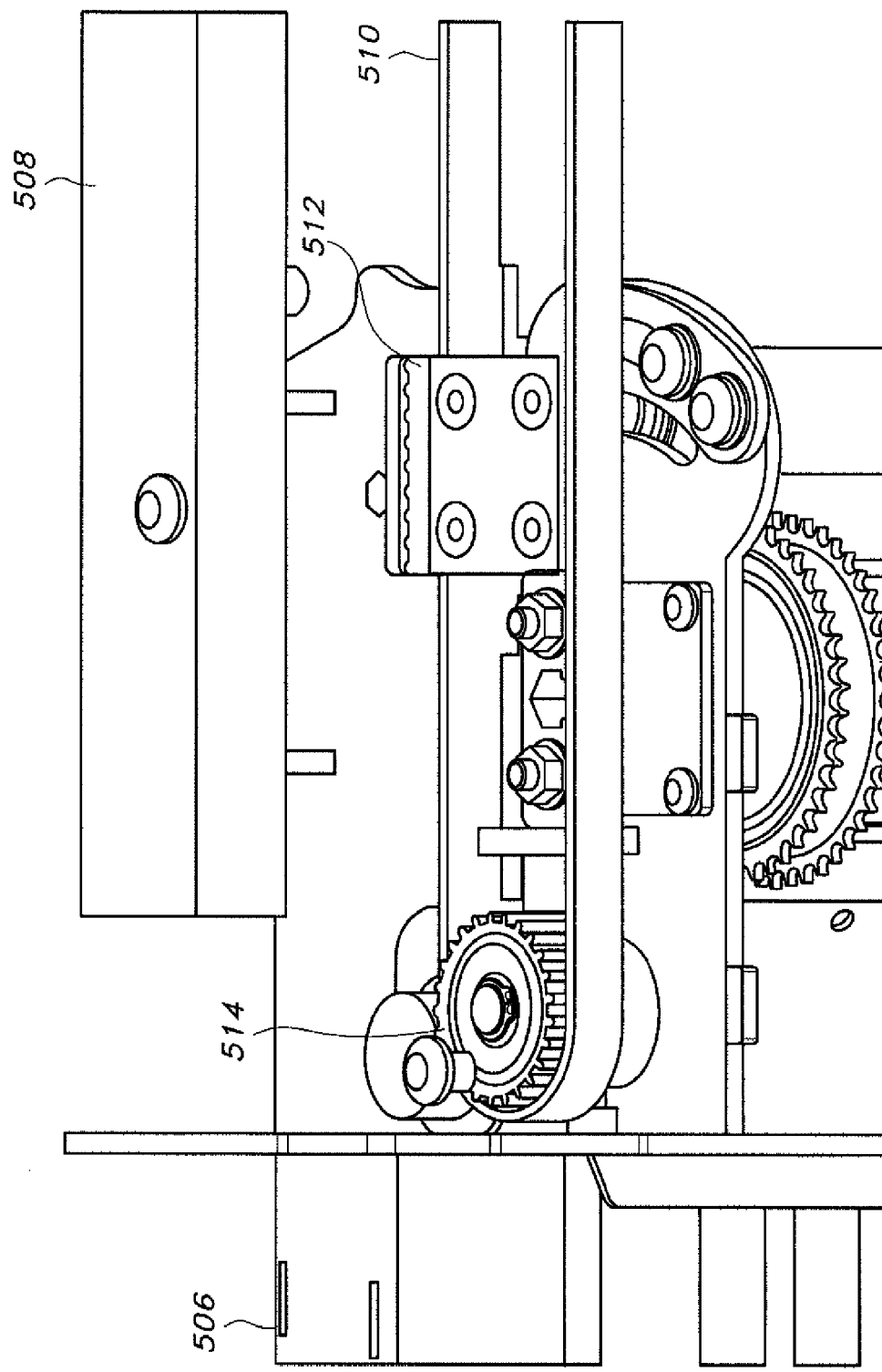

FIGS. 31-33 illustrate additional concepts associated with a sortation system including a transpositor conveyor. For example, as noted above, a transpositor conveyor 500 may comprise one or more motor driven rollers (which, for purposes of this disclosure, comprise rollers incorporating a self-contained drive mechanism, or motor, for causing the roller to rotate, which are available from Insight Automation, Inc. of Erlanger, Ky.). For example, a first motor driven roller 502 may be provided for advancing the conveyor chain 501 relative to any support structure, such as a bed, while a second such roller 504 serves to extend and retract the bed 506 relative to the base 508 of the conveyor 500. This may be achieved using a toothed belt 510 coupled to the bed 506, such as by a connector 512, and driven over an idler 514 by the motor drive roller 504 (which may include a similar idler, not shown). The first roller 502 via sprockets 502a may thus drive the chain 501 to advance the articles being conveyed, including in the extended or retracted condition of the base 508.

As can be appreciated from these figures, the use of self-contained motor driven rollers in this manner results in a transpositor conveyor 500 having an extraordinarily low profile. This advantageously reduces the space requirements, and also facilitates maintenance (including, as discussed further below, the ability to raise the bed 506 and base 508 together as a discrete unit).

Figure 34:
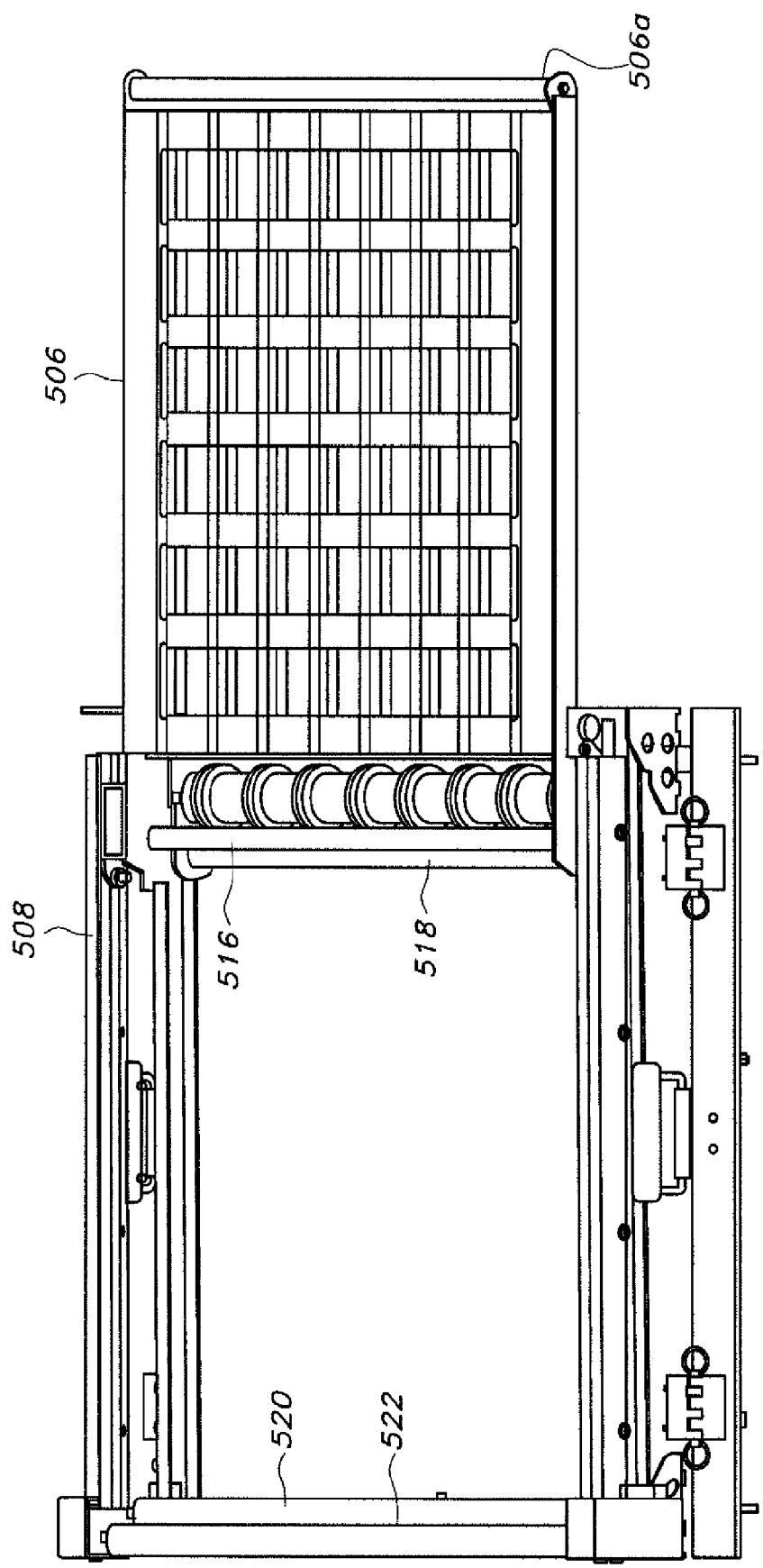

FIG. 34 illustrates the manner in which the chain (not shown for purposes of clarity) may be supported in the conveyor 500. Specifically, the chain may extend along the movable bed 506 and over the nose roller 506a. The chain passing below the bed 506 encounters a first idler 516, which is connected to the bed 506 and thus moves with it. This idler 516 guides the chain to the motor driven roller 502, and a further idler 518 guides the chain to an idler 520 supported by the base 508. The chain next engages a further idler 522 that guides it to create the conveying surface.

Figure 35:
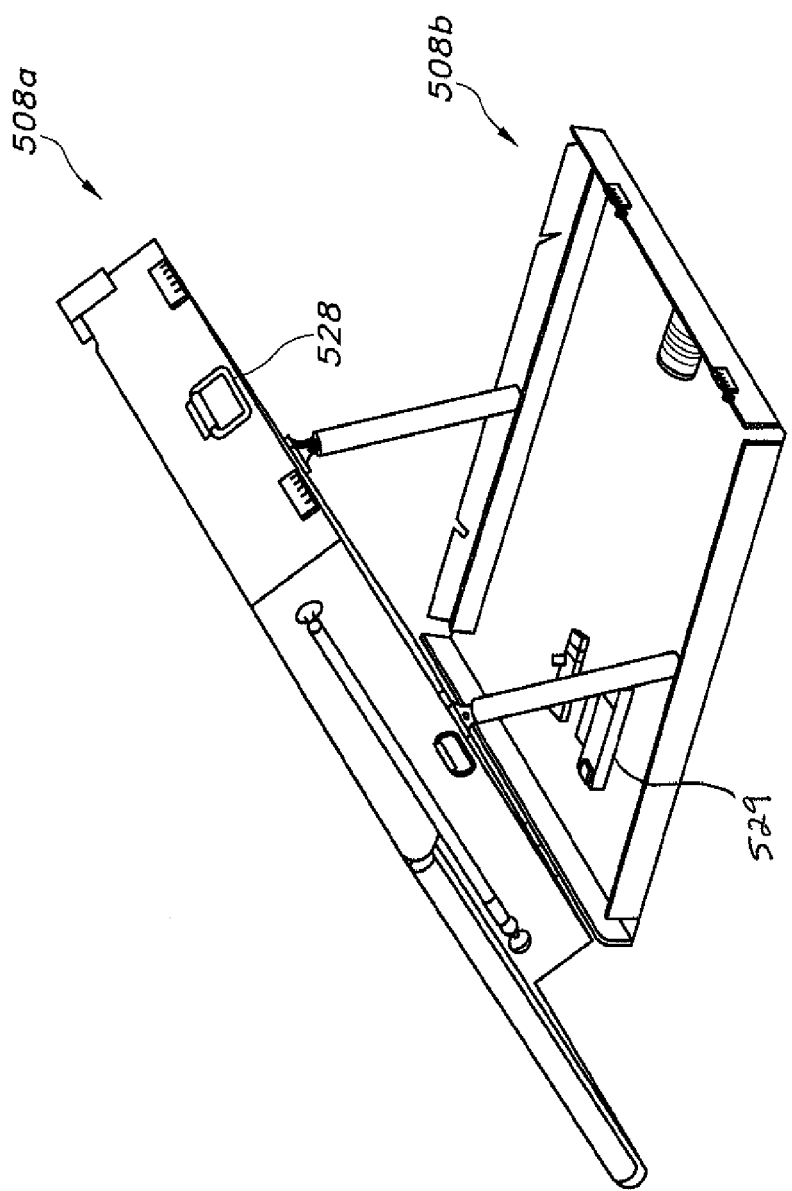
Figure 36:
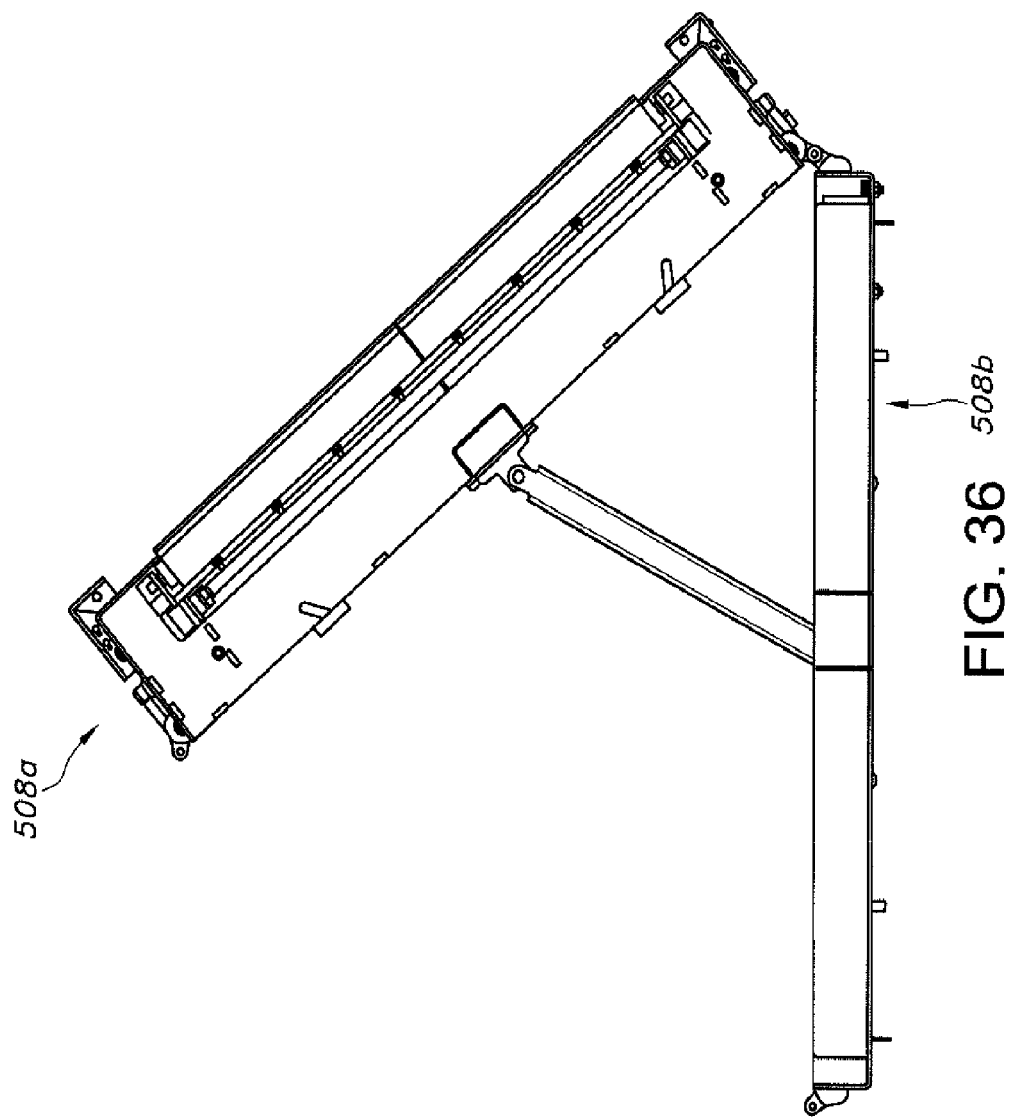
Figure 37:
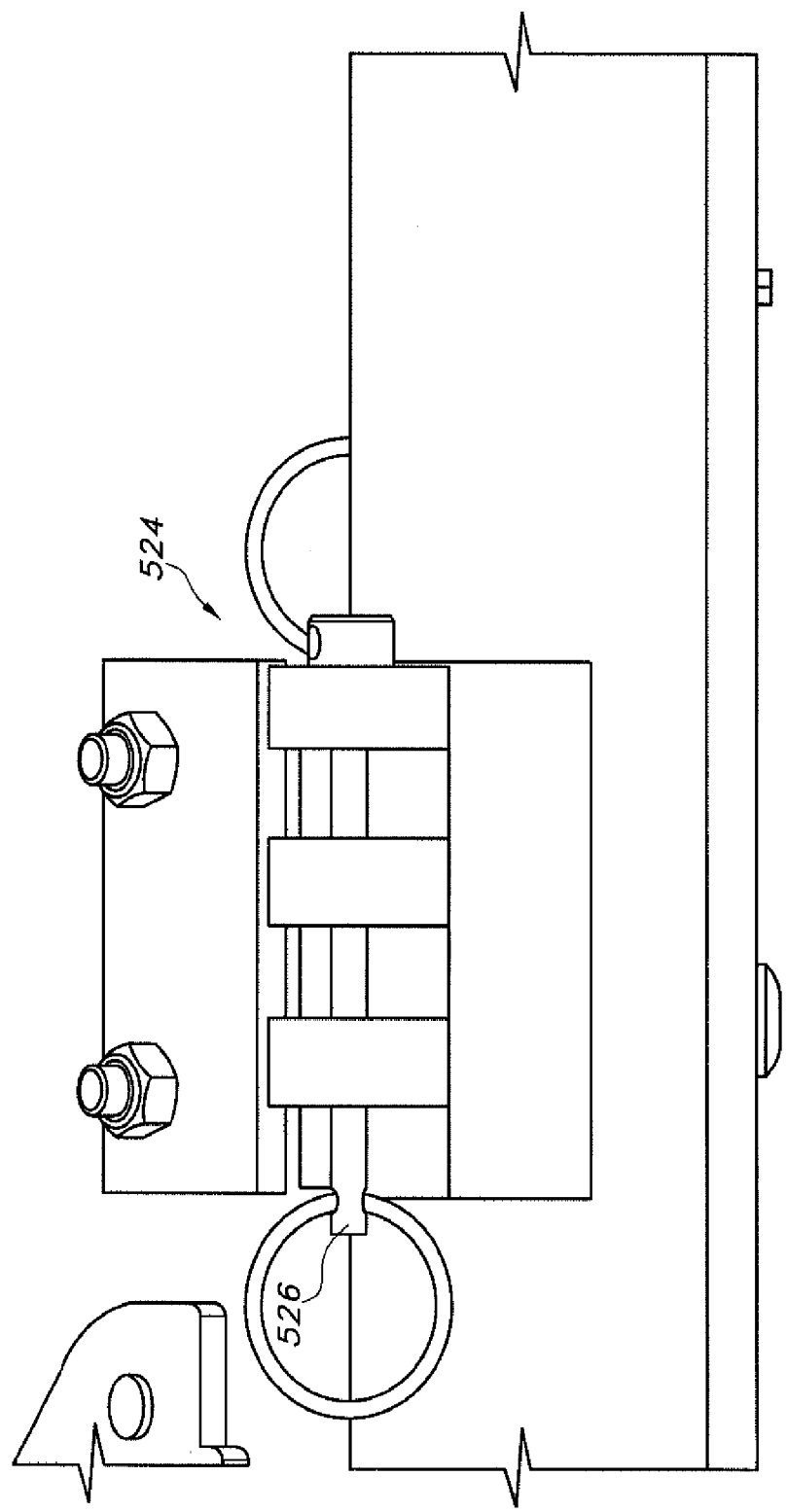
Figure 38:
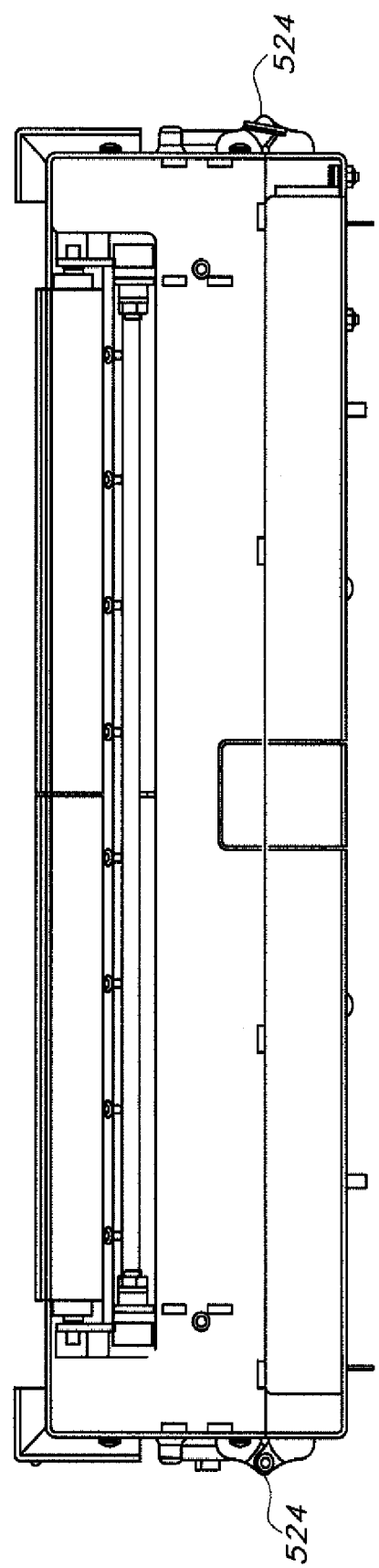

As indicated in FIG. 30, and more clearly shown in FIGS. 35 and 36, the base 508 may be divided into two portions, such as an upper portion 508a removably connected to a lower portion 508b. As perhaps best understood with reference to FIGS. 37 and 38, the connection may be established using pairs of hinges 524 on opposite sides of the base 508 in a direction transverse to the conveying direction. Each hinge 524 may be releasable, such as by including a removable pin 526, so that the upper portion 508a of the base 508 may be tilted relative to the lower portion 508b in either direction.

A handle 528 may be provided to facilitate raising and lowering the upper portion 508a relative to the lower portion 508b. Indeed, it should be appreciated that, by releasing all hinges 524, the upper portion 508a may be completely disconnected and bodily lifted from the lower portion 508b. This may be done to facilitate maintenance, or to replace the upper portion 508a with a new unit entirely.

Figure 39:
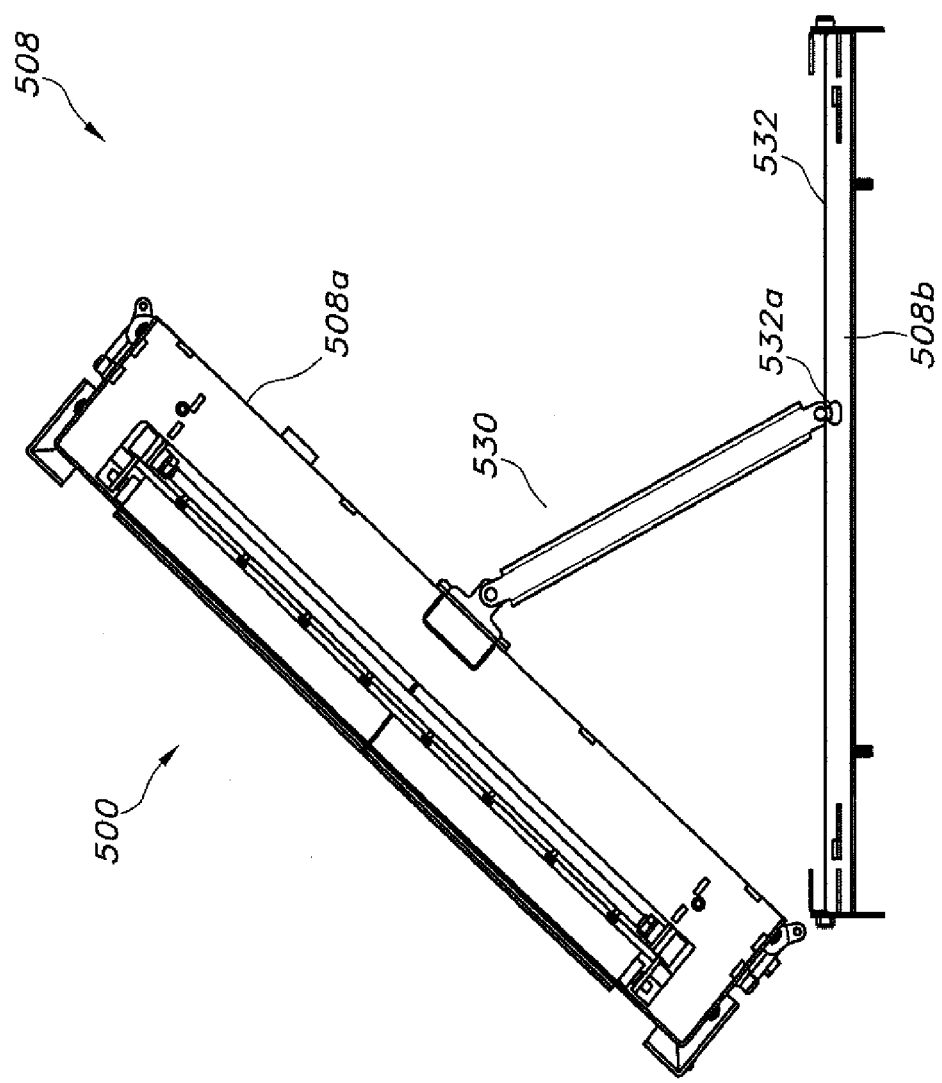

The lower portion 508b may form a tray for receiving various controllers 529, components or wires associated with the operation of the transpositor conveyor 500. To facilitate access to these components for maintenance or repair, one or more supports may be provided for supporting the upper portion 508a relative to the lower portion 508b. For example, the supports may comprise legs 530 pivotally mounted to the underside of the upper portion 508a of the base 508 at one end, and adapted to slide along a channel 532 formed in the lower portion 508b at the other end (and may also be releasable therefrom, such as through an intermediate upper opening 532a, as shown in FIG. 39). The arrangement may be such that the pivoting may occur in the desired manner to provide the support regardless of the direction in which the upper portion 508a of the base 508 is tilted (e.g., from the front, as shown in FIG. 35, or from the rear).

Figure 40:
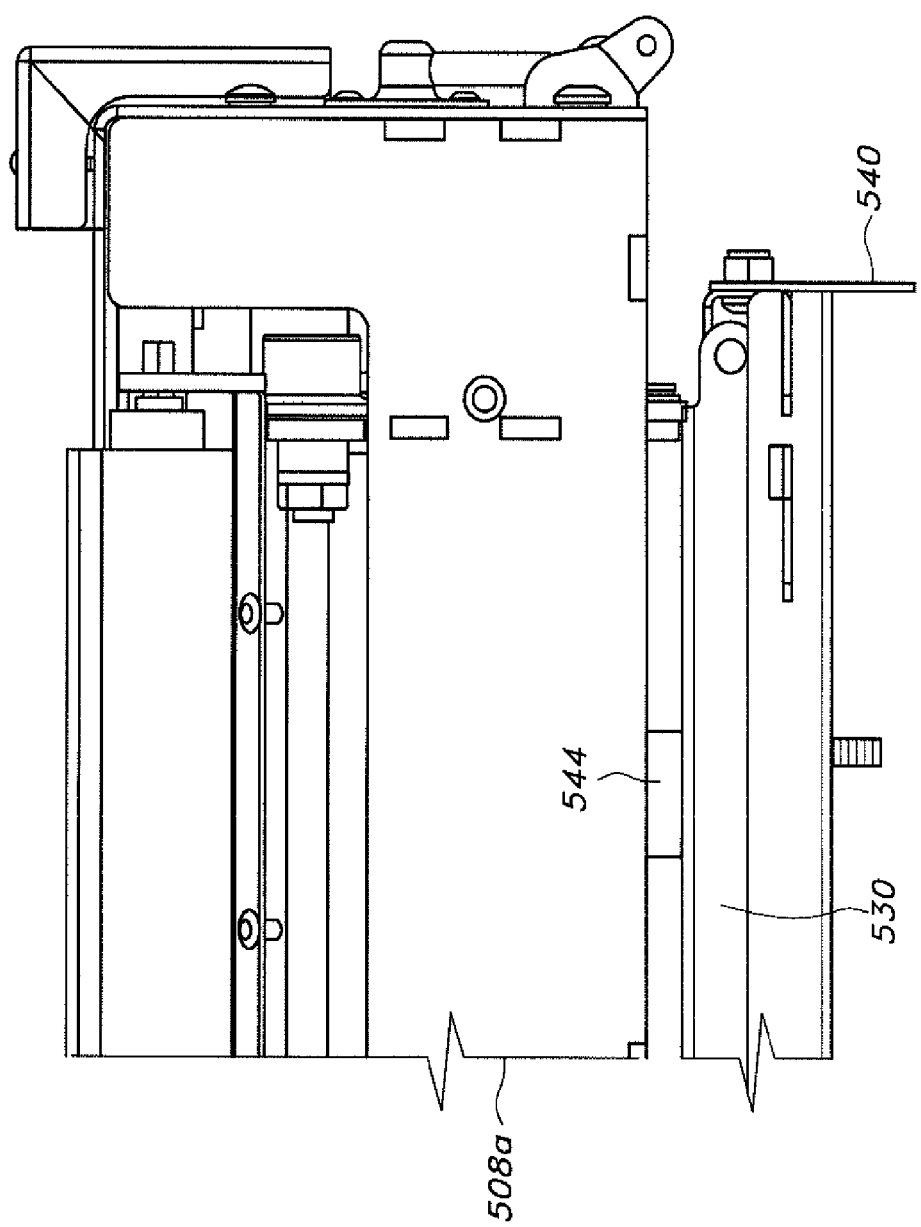
Figure 41:
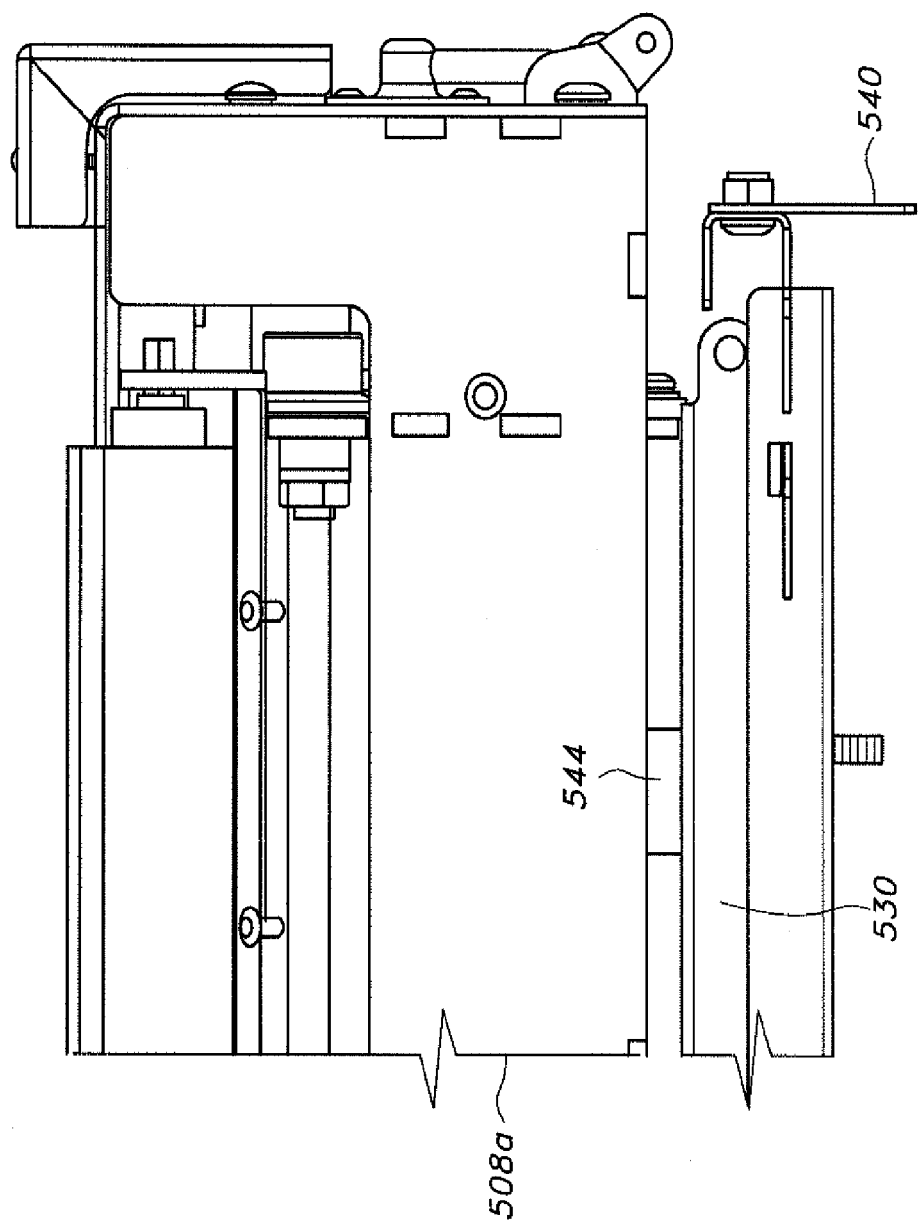
Figure 42:
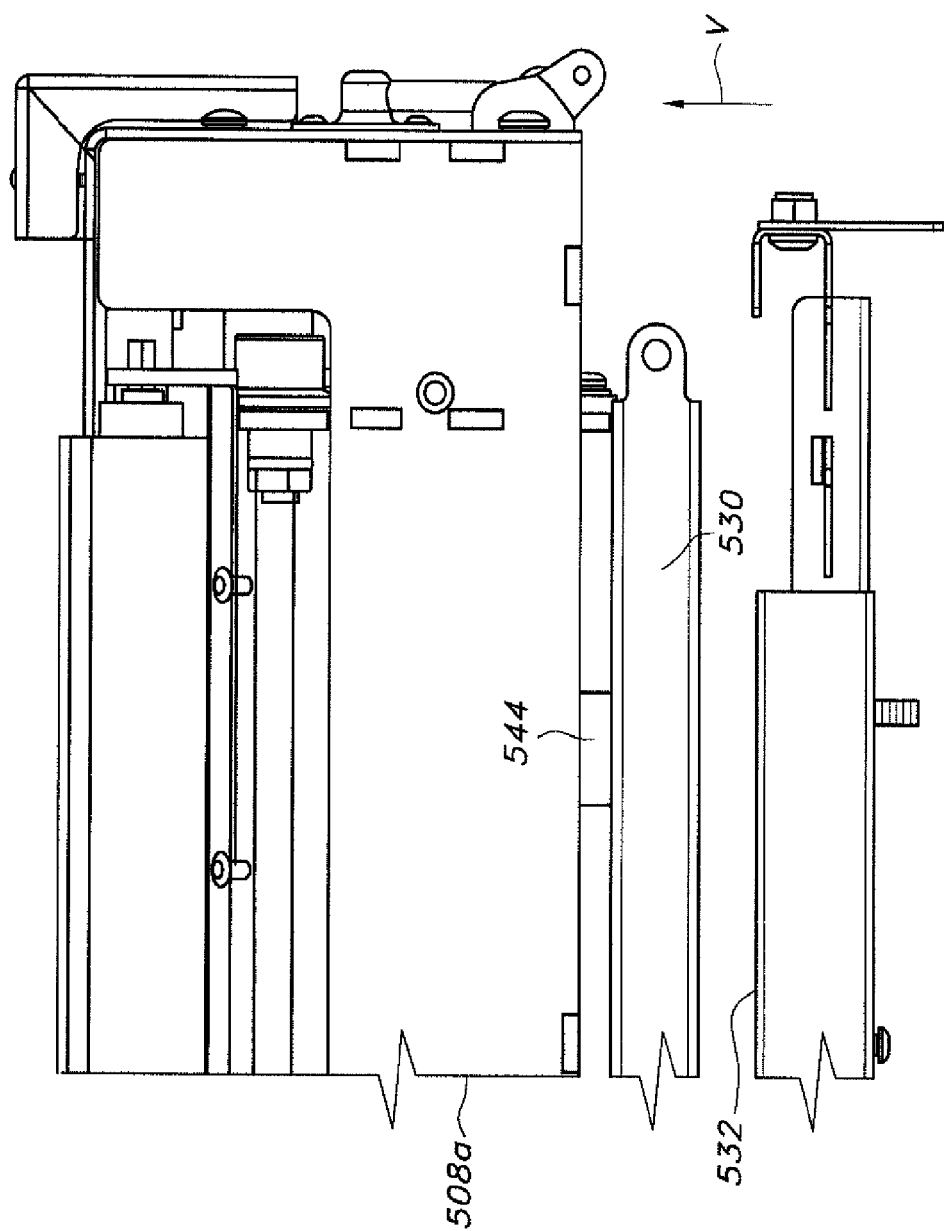

An optional feature relates to retaining the legs 530 relative to the upper portion 508a of the base 508 during lifting. As shown in FIG. 40, this may be achieved by using a releasable stripper 540, which may be provided on one or both ends of the channel 532. The stripper 540 may be adjusted as illustrated in FIG. 41 to uncover the normally captured end of the leg 530 that travels in channel 532. A releasable coupling may be formed between the leg 530 and the upper portion 508a of the base 508, such as by using a magnet 544. Consequently, when the upper portion 508a of the base 508 is bodily lifted in a vertical direction V, as shown in FIG. 42, the leg 530 is retained in the non-extended or retracted condition as a result of the connection, such as by the coupling between the magnet 544 and the ferromagnetic material of the leg 530.

Figure 43:
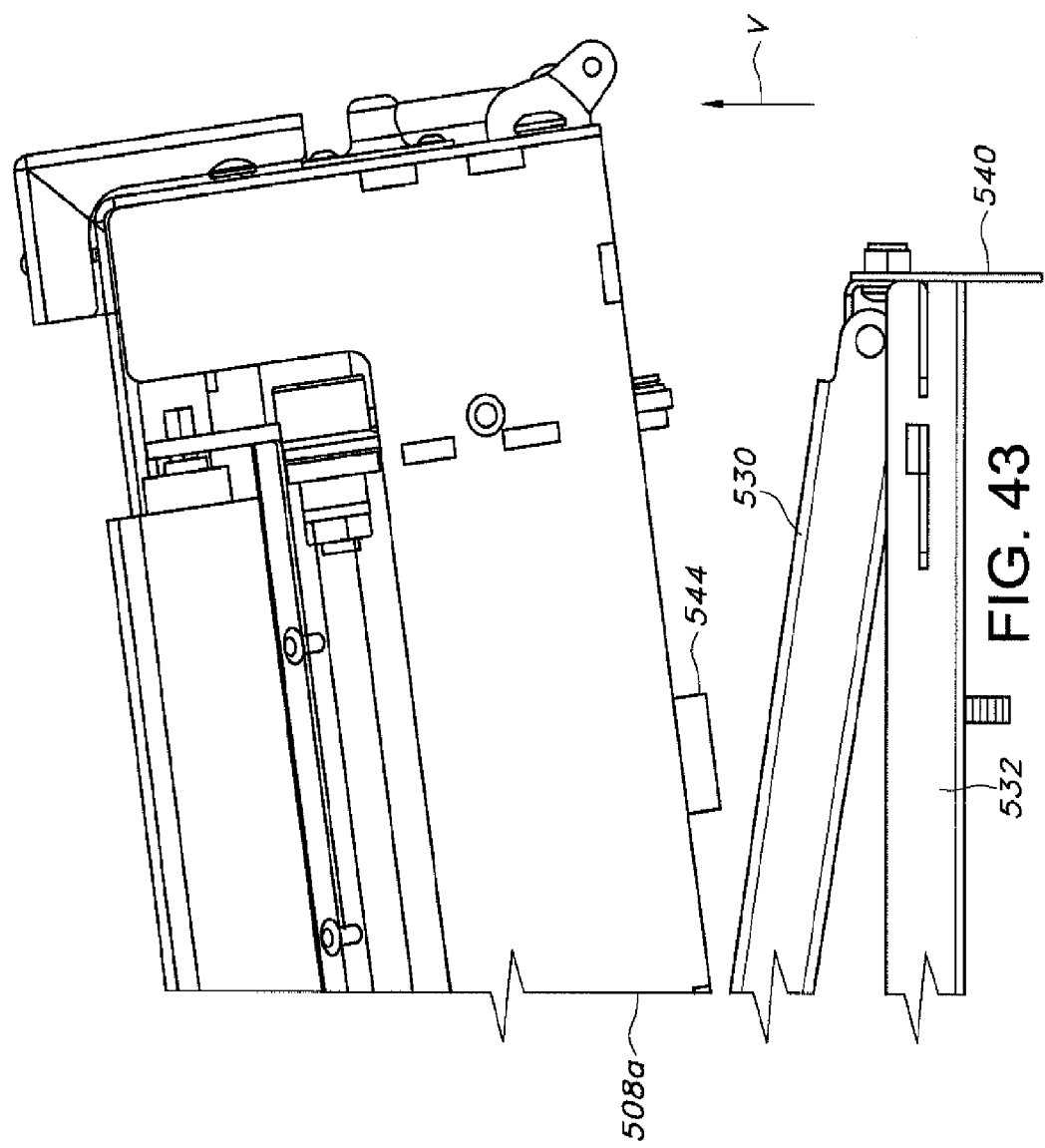

Turning to FIG. 43, it can be understood that, when the stripper 540 is in the home or retracted condition, the leg 530 is prevented from initially lifting from the channel 532 in a vertical direction V. The initial retention is such that the connection between the upper base portion 508a and the leg 530 is not maintained, such that the coupling with magnet 544 is broken. Consequently, the leg 530 remains in contact with the channel 532 and thus provides the support in the desired manner.

Figure 44:
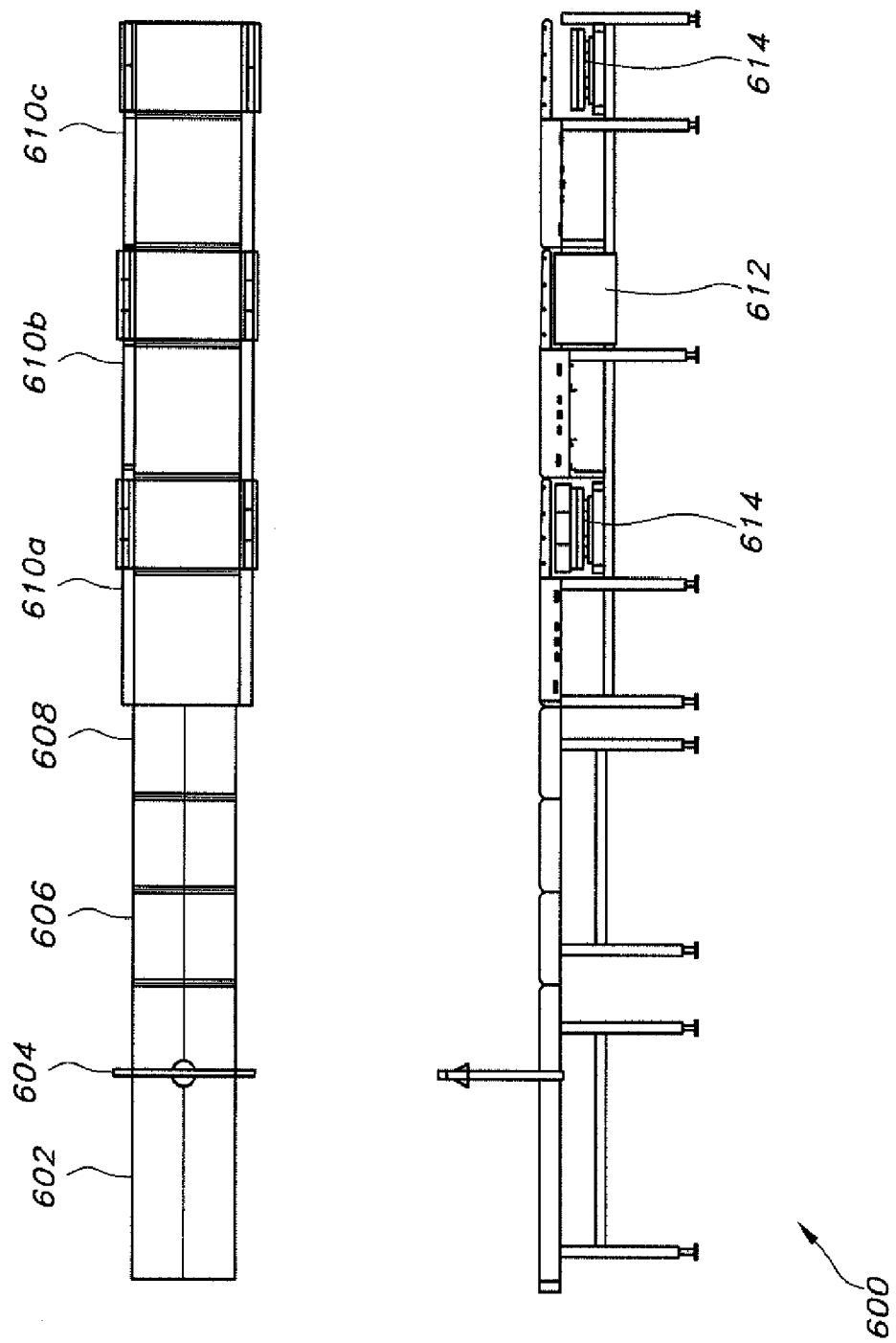
Figure 45:
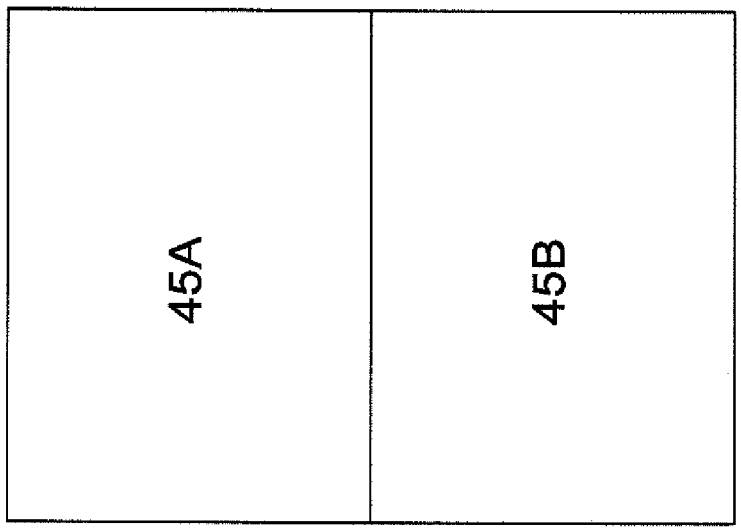
Figure 45A:
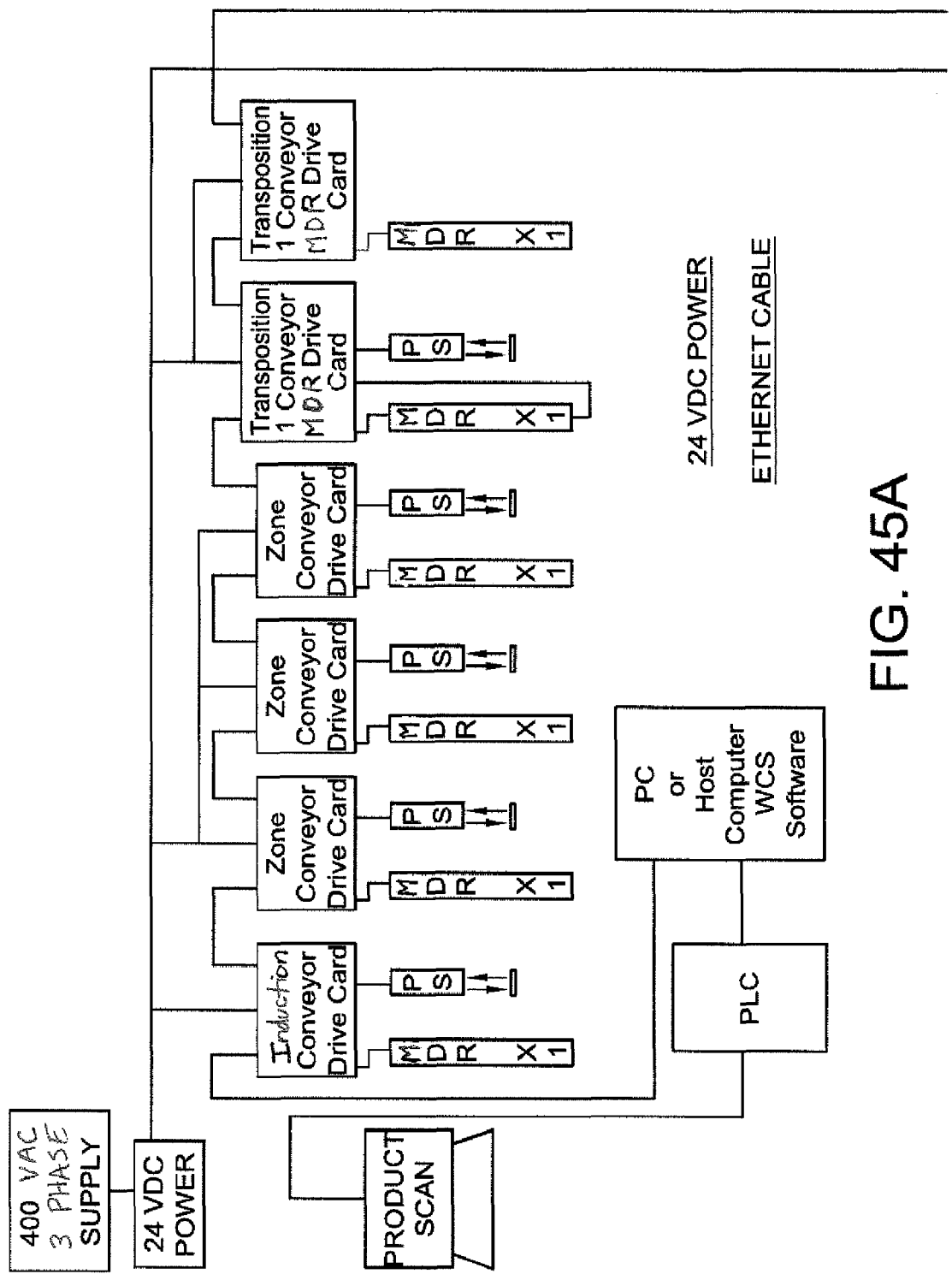
Figure 45B:
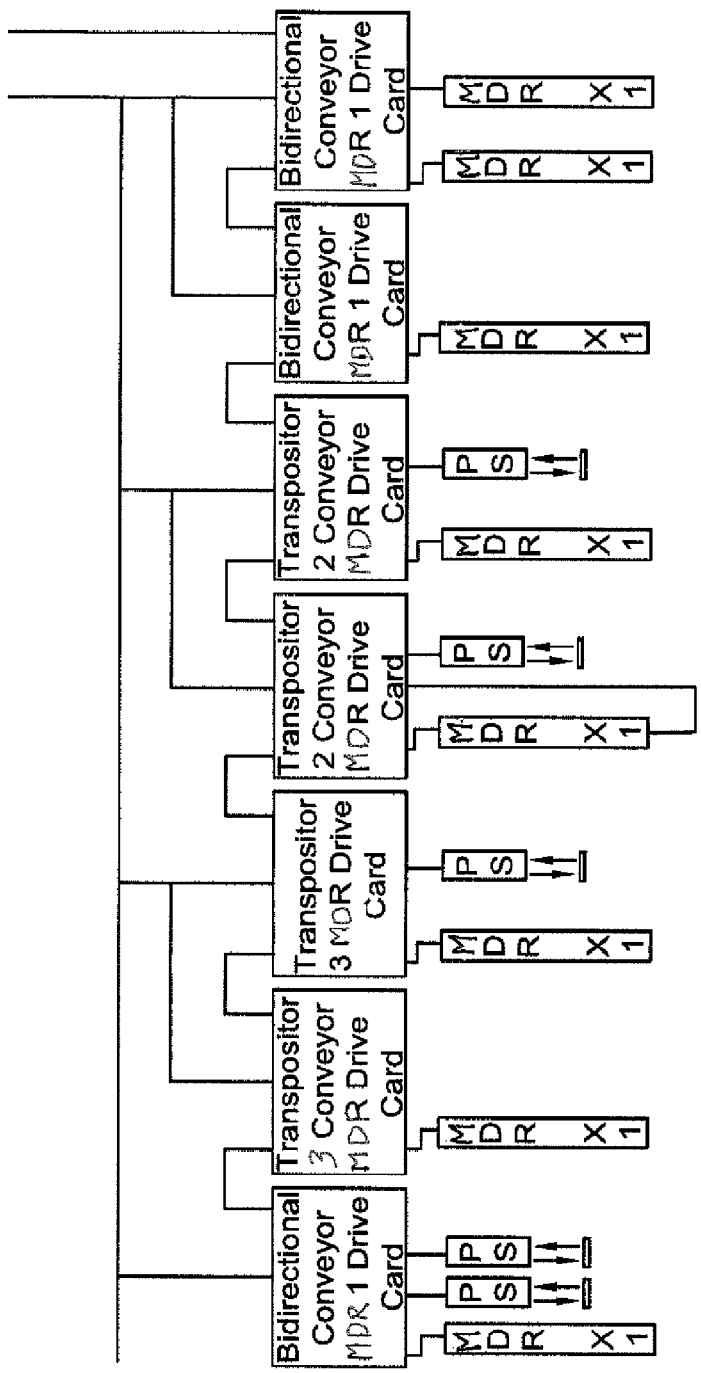

One possible control arrangement is described with reference to FIGS. 44 and 45. Product to be sorted may be introduced to the system 600 shown by way of an upstream induction conveyor 602. The product then passes an induction scanner 604, which identifies the product (such as by barcode, RFID, machine vision, product dimensions, etc.). Based on this information, an associated controller (not shown) determines the intended location for the product.

The product proceeds along the induction conveyor 602 past a sensor, such as a photo sensor. The length of the product may be determined by the number of pulses generated by a sensor associated with the motor driven roller of the transpositor while the product is in detected by the sensor. The product may then proceed onto a first zone conveyor 606, with the product position determined by a sensor at the infeed end. The product is tracked through the system by additional photo sensors located at the infeed end of each zone conveyor or transpositor.

The products may be released by the final zone conveyor 608 at intervals determined by the product length calculation performed at the end of the induction conveyor 602. The length of each product may determine the pitch required by each product to allow sufficient space for the destination transpositor 610a, 610b, 610c to retract and deposit the product at the proper location, allow the product to clear the area in front of the transpositor, and return to the extended position in time for the next product to transfer to the next transpositor. When the product reaches the destination transpositor 610a, 610b, 610c, the infeed sensor triggers position tracking using internal proximity switches of the motor driven roller. If the product is for delivery to a tilt tray 612, the associated tray may be pre-positioned to guide the product to the desired (e.g., left or right) destination.

If the destination transpositor 610a, 610b, 610c, is a single position device, the product is tracked to the nose retract trigger point, and the motor driven roller retracts the nose to allow the product to fall onto the takeaway conveyor 614. The retract trigger also starts the bidirectional conveyor running in the proper direction deliver the product to the desired (e.g., left or right) destination.

If the product is being delivered to a multi (e.g., 2 or 3) position transpositor, the nose retract motor driven roller will pre-position the nose to the far edge of the destination position. This pre-positioning allows for faster throughput if successive products have destinations serviced by the same transpositor.

Figure 46:
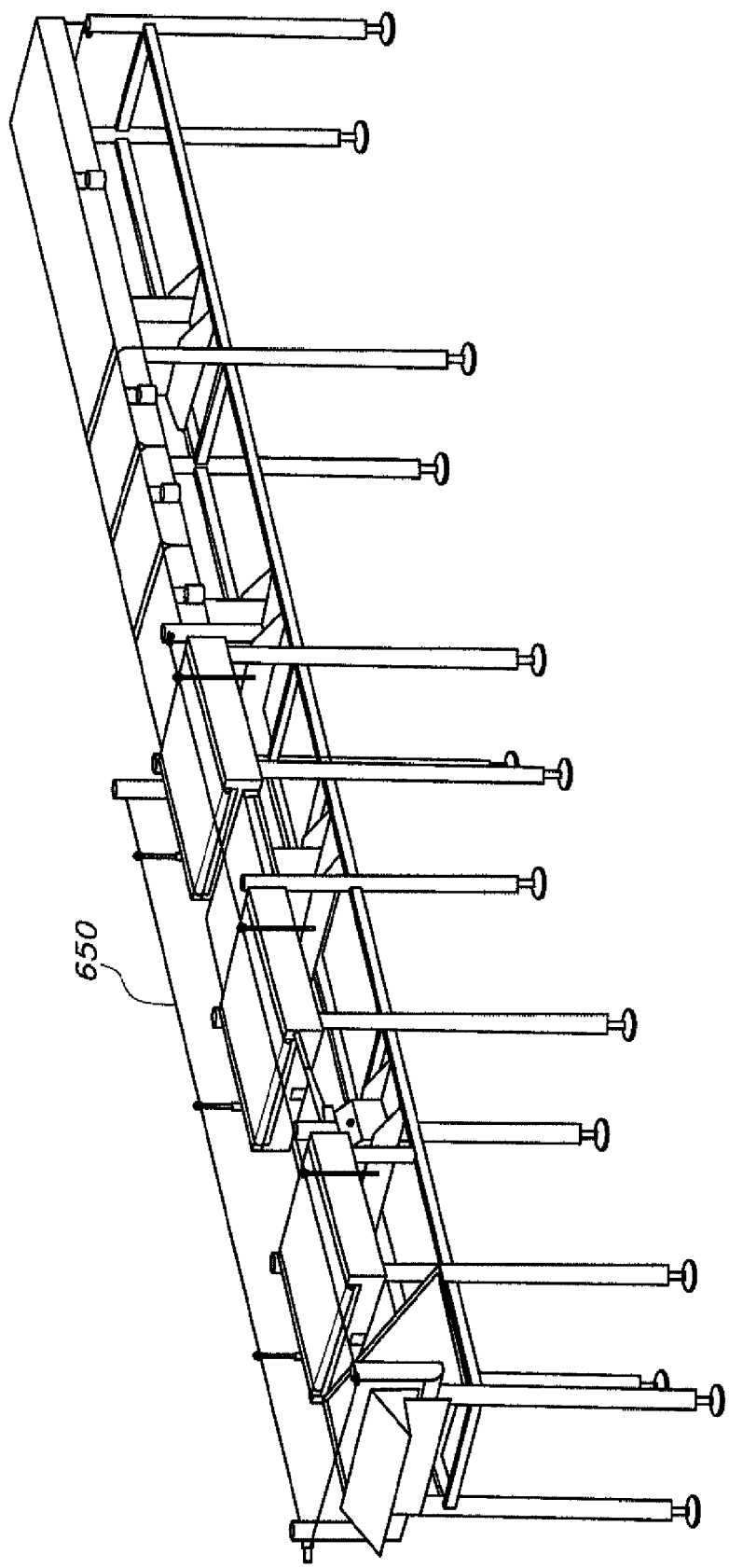

As shown in FIG. 46, the system may be supplied with an "E"—Stop Pull cord system 650 which will run along both sides of the conveyor. Additional safety measures may include: (1) If a product sensor is covered when the transpositor nose is moving forward, the control system will stop the forward nose movement and indicate a jam; (2) a rapid increase in motor current during forward movement of the nose will indicate a jam and cause the control system to shut down; and/or (3) an interruption of the pulse train tracking the forward movement of the nose will indicate a jam and cause the control system to shut down.

The foregoing descriptions of various embodiments of sortation systems and related methods provide illustration of the inventive concepts. The descriptions are not intended to be exhaustive or to limit the disclosed invention to the precise form disclosed. Modifications or variations are also possible in light of the above teachings. For example, the conveyors 12, 14, 16, 34 if comprised of modular links may be provided with specialized links or rollers to facilitate article transfer (see, e.g., U.S. Pat. No. 6,874,617 to Layne, the disclosure of which is incorporated herein by reference). Also, it should be appreciated that books are mentioned merely to illustrate one possible type of article capable of being conveyed or sorted using the disclosed inventions. The embodiments described above were chosen to provide the best application to thereby enable one of ordinary skill in the art to utilize the inventions in various embodiments and with various modifications as are suited to the particular use contemplated (such as, again, for conveying or sorting articles other than books). All such modifications and variations are within the scope of the invention.

The invention claimed is:

1. A conveyor system for intended use in conjunction with the sorting of articles, comprising:
   a first conveyor comprising a transpositor having an extended condition for bridging an upstream section of the first conveyor with a downstream section of the first conveyor and a retracted condition; and
   a plurality of conveyor lanes, each arranged for receiving one or more articles deposited from the transpositor, said transpositor at least partially covering the plurality of conveyor lanes in the extended condition.

2. The conveyor system of claim 1, wherein the plurality of conveyor lanes are adjacent conveyor lanes formed by a divider.

3. The conveyor system of claim 1, wherein the plurality of conveyor lanes are adjacent conveyor lanes formed by a space or gap.

4. The conveyor system of claim 1, wherein the plurality of conveyor lanes comprise a first conveyor lane formed by a first conveyor and a second conveyor lane formed by a second conveyor.

5. The conveyor system of claim 4, wherein the first and second conveyors are adapted for conveying objects in the same or different directions.

6. The conveyor system of claim 1, wherein the plurality of lanes are formed on a single conveyor.

7. The conveyor system of claim 1, further including a controller for controlling the movement of the transpositor to deposit at least one article onto a selected one of said conveyor lanes.

8. The conveyor system of claim 1, wherein at least one conveyor including at least one of the lanes is height-adjustable relative to the transpositor.

9. The conveyor system of claim 1, wherein the first conveyor includes a second transpositor.

10. The conveyor system of claim 1, wherein at least one of the plurality of lanes is provided on a belt or chain.

11. The conveyor system of claim 1, wherein each of the plurality of lanes is provided on a belt or chain.

12. The conveyor system of claim 1, wherein each of the plurality of conveyor lanes extends from one side of the first conveyor to another side of the first conveyor.

13. A conveyor system for intended use in conjunction with the sorting of articles, comprising:
   a first conveyor comprising a transpositor; and
   a second conveyor for receiving at least one article from the transpositor, the second conveyor adapted for selectively conveying the article in a first direction or a second direction.

14. The system of claim 13, wherein the second conveyor comprises one of a tilt tray or an endless belt or chain.

15. The conveyor system of claim 13, wherein the second conveyor extends in the first direction from one side of the first conveyor and in the second direction from another side of the conveyor.

16. A conveyor system for intended use in conjunction with the sorting of articles, comprising:
a first conveyor comprising a transpositor;
a second conveyor for receiving at least one article from the transpositor; and
an actuator for raising and lowering the second conveyor relative to the first conveyor.

17. A conveyor system for intended use in conjunction with the sorting of articles, comprising:
a first conveyor including a transpositor; and
a second conveyor for receiving at least one articles from the transpositor;
an actuator for raising and lowering the second conveyor relative to the first conveyor;
a controller for controlling the actuator to raise or lower the second conveyor based on a characteristic of the article.

18. The conveyor system of claim 17, further including a sensor for sensing the characteristic of the article.

19. The conveyor system of claim 17, wherein the characteristic comprises size.

20. The conveyor system of claim 17, wherein the characteristic comprises height.

21. A system for sorting articles, comprising:
a first conveyor for conveying the articles in a conveying direction, the first conveyor including a transpositor;
a second conveyor for receiving a first article from the transpositor and conveying the first article in a first direction transverse to the conveying direction; and
a third conveyor for receiving a second article from the transpositor, said third conveyor for conveying the second article in a second direction generally opposite the first direction.

22. A conveying system for conveying at least one article having a dimension, comprising:
a transpositor for conveying the at least one article;
a sensor for sensing the dimension of the at least one article; and
an actuator for actuating the transpositor based on the sensed dimension of the article.

23. The conveying system of claim 22, wherein the actuator is adapted for moving a retractable bed of the transpositor to deliver the at least one article to a takeaway conveyor.

* * * * *